United States Patent
Blumenfeld et al.

(10) Patent No.: US 11,182,687 B1
(45) Date of Patent: Nov. 23, 2021

(54) SYNTHETIC IDENTITY DETECTION

(71) Applicant: Sentilink Corp., San Francisco, CA (US)

(72) Inventors: Maxwell Blumenfeld, San Francisco, CA (US); Naftali Harris, San Francisco, CA (US)

(73) Assignee: Sentilink Corp., San Francisco, CA (US)

( * ) Notice: Subject to any disclaimer, the term of this patent is extended or adjusted under 35 U.S.C. 154(b) by 870 days.

(21) Appl. No.: 15/974,137

(22) Filed: May 8, 2018

(51) Int. Cl.
*G06N 20/00* (2019.01)
*G06N 5/04* (2006.01)
*G06Q 50/26* (2012.01)
*G06F 16/901* (2019.01)

(52) U.S. Cl.
CPC ......... *G06N 5/048* (2013.01); *G06F 16/9024* (2019.01); *G06N 20/00* (2019.01); *G06Q 50/265* (2013.01)

(58) Field of Classification Search
None
See application file for complete search history.

(56) References Cited

U.S. PATENT DOCUMENTS

2014/0258089 A1* 9/2014 Pearson ............... G06Q 40/025
705/38

OTHER PUBLICATIONS

Zhou et al., Discovering rare categories from graph streams, 2017,Springer, pp. 400-423 (Year: 2017).*

* cited by examiner

*Primary Examiner* — David R Vincent
(74) *Attorney, Agent, or Firm* — Morgan, Lewis & Bockius LLP

(57) ABSTRACT

A system and method for detecting synthetic identities are provided that determine a synthetic identity score for a given user, the synthetic identity score indicating a likelihood that the given user is using a synthetic identity to conduct activities. The synthetic identity score generated by the system and method disclosed herein can then be used to determine a risk associated with the given user and to inform what actions to take based on the associated risk that the given user may use the synthetic identity to perform a bad act.

20 Claims, 20 Drawing Sheets

310 ⇘

┌─────────────────────────────────────────────────────────────┐
│ Soft-link users to the given user in response to a given soft user │ ─ 410
│ attribute to form a layer of associated soft-linked users   │
└─────────────────────────────────────────────────────────────┘
                              ↓
┌─────────────────────────────────────────────────────────────┐
│ Hard-link users to each soft-linked user in the layer of associated │ ─ 420
│ soft-linked users                                            │
└─────────────────────────────────────────────────────────────┘
                              ↓
┌─────────────────────────────────────────────────────────────┐
│ Hard-link users to the given user in response to a given hard user │
│ attribute to form a layer of associated hard-linked users, wherein │ ─ 435
│ each hard-linked user in the layer of associated hard-linked users │
│ has one degree of separation from the given user             │
└─────────────────────────────────────────────────────────────┘
                              ↓
┌─────────────────────────────────────────────────────────────┐
│ For each linked user in a given layer having two or more degrees │
│ of separation from the given user, link additional users to each │
│ linked user in the given layer to form a subsequent layer of  │ ─ 440
│ subsequently associated linked users to the linked users in the │
│ given layer                                                  │
└─────────────────────────────────────────────────────────────┘

FIG. 4C

SYNTHETIC IDENTITY DETECTION

BACKGROUND OF THE INVENTION

Identity thieves typically steal an individual's identity by obtaining confidential identity or credit information about an individual to engage in fraudulent transactions by impersonating the individual. In contrast, synthetic identity fraudsters create a fake or synthetic identity and build up a history of good behavior by engaging in a series of events using the synthetic identity. Based on the established historical record, the synthetic identity fraudster acquires benefits and engages in fraudulent activities under the guise of the synthetic identity. For example, in the credit and loan industry, synthetic identity fraudsters create a synthetic identity and use it to engage in transactions and to apply for credit. After establishing a good credit history for the synthetic identity and securing access to larger amounts of credit, the synthetic identity fraudster takes out large consumer or business loans or performs other high value transactions using real credit cards under a synthetic identity with no intention of being accountable for the acquired debt. Lending institutions extending this credit have little recourse against the synthetic identity (which corresponds to a fake person who does not actually exist), resulting in credit losses that amount to billions of dollars per year.

To compound the synthetic identity problem, unlike identity theft where the victim is a real person who notices and reports fraudulent transactions as they occur using his or her stolen identity, synthetic identities are not attached to real people. Consequently, no one reports fraudulent transactions made by synthetic identities as fraud. Indeed, in the credit application example described above, synthetic identity fraudsters are incentivized to behave in a manner that establishes the synthetic identity as a good credit user over a certain period of time in order to obtain a higher credit limit to facilitate a final bad act with a large payoff, (often called a "bust-out").

BRIEF DESCRIPTION OF THE DRAWINGS

Various embodiments of the invention are disclosed in the following detailed description and the accompanying drawings.

FIG. 4C is a flowchart illustrating additional steps included in an exemplary process 310 to generate additional layers in the layered graph network of linked users as described herein.

DETAILED DESCRIPTION

Figure 1:
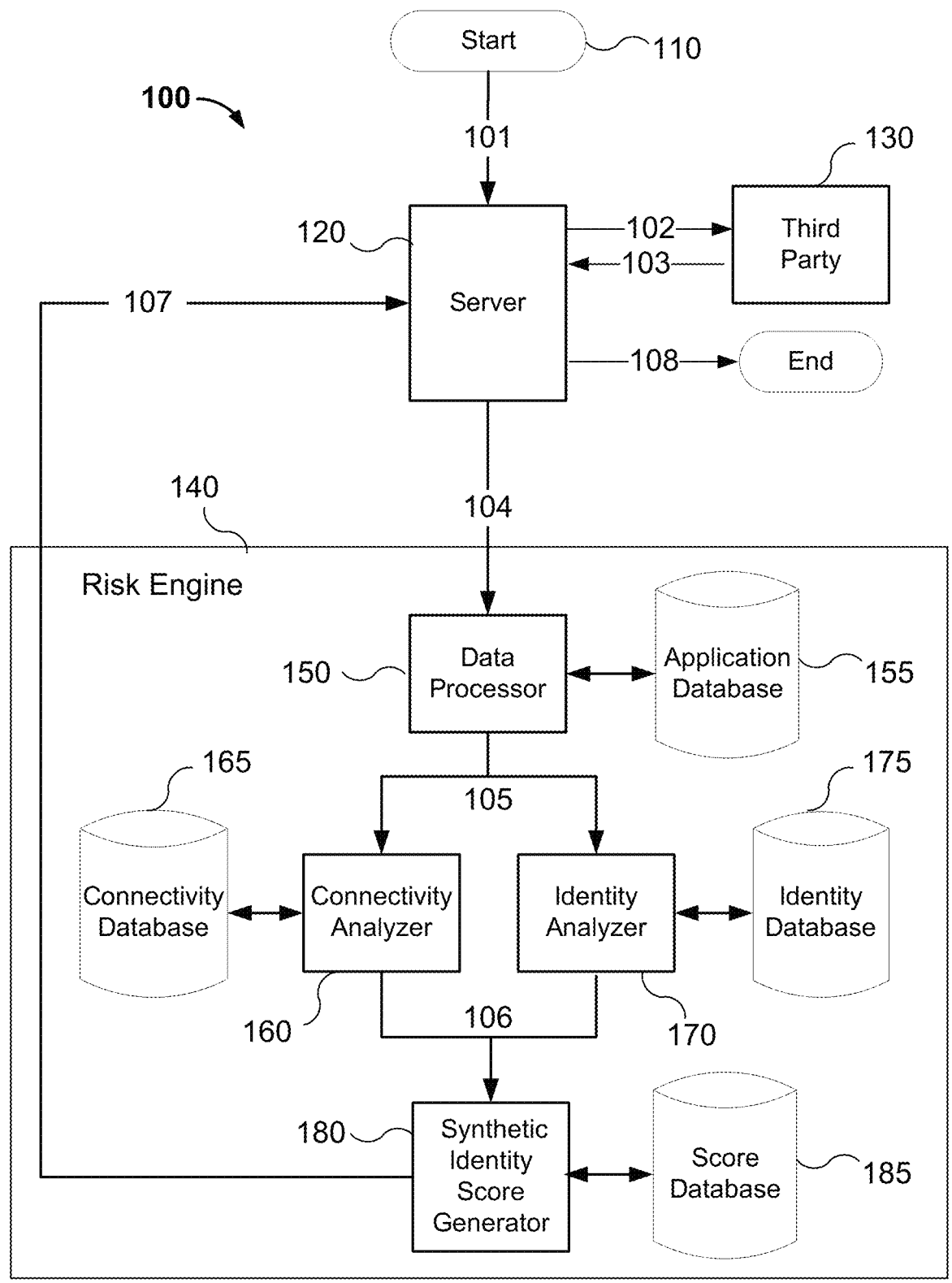
FIG. 1 is a block diagram depicting an embodiment of a system for detecting synthetic identities.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Identity theft produces quick but limited gains through unauthorized transactions reported promptly by individual victims as fraud. In contrast, synthetic identity fraud perpetrated using synthetic identities generates slow but substantial gains that are not reported as fraud and go unnoticed in this respect.

A typical synthetic identity syndicate has hundreds if not thousands of synthetic identities active at the same time, none of which correspond to an actual person. While a number of approaches have been offered to detect fraud perpetrated through identity theft, these solutions are not designed for, and are thus inadequately equipped to handle the growing problem of synthetic identity fraud. This is due in a large part to the fact that synthetic identity fraud manifests itself differently as compared to identity theft, and so a conventional system designed to detect and combat identity theft will fail to recognize a synthetic identity.

The rise of synthetic identity fraud perpetrated through the use of synthetic identities is costing institutions billions of dollars in losses each year. To make matters worse, at least in the credit and loan industry, the massive losses attributable to synthetic identity fraud are not classified as fraud but are instead misclassified as credit losses. This results in a substantially inflated amount attributed to credit loss that damages the credit model on which both lenders and consumers depend. The consequences are detrimental to both legitimate users of credit and loans and to the institutions providing the service. These institutions currently have no tools to effectively detect synthetic identities and thus are unable to take action or have any recourse against bad actors who acquire large loans under synthetic identities with no intention of being accountable for the money they have taken.

An effective solution to this problem starts with recognizing how synthetic identities and synthetic identity fraud are manifested in the real world, which requires an understanding of how synthetic identities are created and maintained and how synthetic identity fraud is typically perpetrated. Understanding what to look for, where to look, and how to extract, process, and analyze the most predictive indicators from various and disparate sources of data is critical to successfully distinguishing synthetic identities from real identities associated with legitimate users.

To this end, a system and method for detecting synthetic identities are provided that determine a synthetic identity score for a given user, the synthetic identity score indicating a likelihood that the given user is using a synthetic identity to conduct activities. The synthetic identity score generated by the system and method disclosed herein can then be used to determine a risk associated with the given user and to inform what actions to take based on the associated risk that the given user may use the synthetic identity to perform a bad act.

More specifically, a system for detecting a synthetic identity as disclosed herein includes a processor configured to generate a layered graph network of linked users and a memory coupled to the processor and configured to provide the processor with instructions. The layered graph network of linked users is configured to capture a group of similar applicants in response to user data associated with a given user. The user data can include, for example, collected or monitored user activity and historical user data including credit history. The system derives collective connectivity indicators from the layered graph network, reconstructs a user score progression (e.g., a credit score progression) in response to a user history of the given user, and derives individual identity indicators from the reconstructed user score progression. The collective connectivity indicators are configured to capture patterns manifested in the group of similar applicants to the given user, whereas the reconstructed user score progression is configured to capture patterns in the given user's individual behavior. Based on or in response to the collective connectivity indicators and the individual identity indicators, the system determines a synthetic identity score for the given user, the determined synthetic identity score indicating a likelihood that the given user is using a synthetic identity to conduct activities on that application.

Note that, unlike conventional solutions designed to detect identity theft, the unconventional approach described herein derives indicators from two different manifestations of synthetic identities that exhibit distinct differences when compared to their legitimate identity counterparts. In particular, the disclosed technique derives indicators from a collective (e.g., a group of similar users) and from an individual user. Thus, the disclosed approach considers not only how synthetic identities manifest themselves in data across different users in groups of similar applicants who are connected or linked to a given user but also how a synthetic identity manifests itself in data on an individual level that represents the individual behavior of the given user.

Current conventional methods attempt to monitor user data for identity theft and fraud detection through the use of tables or ledgers to track user identity information or user attributes such as a social security number (SSN) or a phone number. However, this approach is flawed in that it only provides counts of how often a particular attribute such as an SSN or phone number has been used without providing any insight into how users sharing the attribute are related to each other. More specifically, although tracking counts of how often an SSN or phone number appears enables a determination that a particular SSN or phone number has been used a certain number of times by one user or by more than one user, current approaches fail to provide information about who these users are, who they are connected or linked to, and how they are connected or linked to other users, in order to determine the relationship between users who share an SSN or any other attribute.

Accordingly, to provide a better understanding and technique for detecting synthetic identities, the unconventional approach disclosed herein is specifically tailored to identify, process, and analyze the types of data that hold the most predictive value for detecting synthetic identities by incorporating an understanding of how synthetic identities are created and maintained and how synthetic identity fraud is typically perpetrated.

First, the tendency for a synthetic identity fraudster or a synthetic identity fraudster ring to conduct activities using multiple (e.g., on the order of hundreds if not thousands) synthetic identities that are active at the same time manifests itself in user data corresponding to presumably different users (but created by the same bad actor) that display certain similarities. Thus, collective connectivity indicators are derived for detecting synthetic identities by analyzing clusters of users (a collective) that are similar in certain respects to the given user or connected or linked in some way to the given user (a connectivity). In particular, the clusters of users are formed by linking users according to a shared characteristic to form a network of linked users. The linkages can be hard, for instance, in the case where two users have the same value for or exactly match a given hard attribute. As an example, two different users can share the exact same phone number, address, or social security number (which in most cases, would indicate a problem). Alternatively, the linkages can be soft, for example by defining a similarity metric for a particular attribute and soft-linking two users according to how similar their respective values are for the particular attribute, where the similarity of values is determined by the similarity metric. For example, two different users may have two different addresses that, while not exactly the same, are close in proximity. As another example, two different users may have similar credit histories as represented by a sequence of transactions or tradelines that, while not exactly the same, exhibit similar patterns of use.

Second, the need for synthetic identity fraudsters to establish a good historical record of user events (e.g., a good credit history) in a relatively short period of time is manifested in an accelerated progression of events characteristic of a synthetic identity that is typically not present in the case of a legitimate identity. This behavioral tendency manifests itself in a pattern that can be extracted from a given user's individual history. In the credit application example, based on or in response to a history of credit events such as tradelines extracted from a given user's credit report, the system reconstructs a credit score progression for the given user and derives individual identity indicators based on or in response to the reconstructed credit score progression. While this is one example of a type of data from which individual identity indicators may be derived, the technique is not limited to the use of reconstructed score progressions. Other types and sources of data and signals that capture or relate to the given user's individual characteristics, patterns of use, or behavior can be used to derive individual identity indicators without limiting the scope of the system and method disclosed herein, certain embodiments of which are described in the following figures.

FIG. 1 is a block diagram depicting an embodiment of a system for detecting synthetic identities. The system 100 is triggered at 110 by a given user who initiates an event by submitting a user request for a service from an institution at 101. Server 120 receives the user request and makes an inquiry at 102 to Third Party 130, requesting for information associated with or related to the given user in order to inform a decision regarding the user request. In response to the inquiry received at 102, Third Party 130 provides the requested information, which is received at 103 by Server 120. Server 120 passes or sends the user request and the requested information associated with the given user that is received from Third Party 130 to Risk Engine 140.

As shown in FIG. 1, Risk Engine 140 comprises various components including Data Processor 150, Application Database 155, Connectivity Analyzer 160, Connectivity Database 165, Identity Analyzer 170, Identity Database 175, Synthetic Identity Score Generator 180, and Score Database 185. The user request and requested information associated with the given user are received at 104 by Data Processor 150, which extracts and processes user data associated with the given user from the user request and requested information. At 105, the processed user data is received and analyzed by Connectivity Analyzer 160 and Identity Analyzer 170. At 106, indicators are derived or generated in response to the analyzed data and are provided to Synthetic Identity Score Generator 180. At 107, Score Generator 180 generates a synthetic identity score for the given user in response to the indicators and provides the synthetic identity score to Server 120. In the example shown, Score Generator 180 applies machine learning techniques to generate a synthetic identity score for the given user in response to the derived indicators. Finally, at 108, Server 120 receives the synthetic identity score, which can be used to determine a risk associated with the given user and to inform what actions to take based on the associated risk that the given user may use the synthetic identity to perform a bad act.

In some embodiments, Synthetic Identity Score Generator 180 provides both the synthetic identity score and the indicators to Server 120. Additionally, the synthetic identity score and/or indicators can be saved, housed, or stored in Score Database 185. In these embodiments, Server 120 receives the synthetic identity score and the indicators, which are used to determine a risk associated with the given user and to inform what actions to take based on the associated risk that the given user may use the synthetic identity to perform a bad act.

In some embodiments, the system includes one or more databases or storage elements for storing received data and generated data. In the example of FIG. 1, Data Processor 150 stores the user request, the requested information associated with the given user, and the extracted and processed user data associated with the given user from the user request and requested information in Application Database 155. Additionally, in the example shown, Connectivity Analyzer 160 stores derived collective connectivity indicators in Connectivity Database 165, Identity Analyzer 170 stores derived individual identity indicators in Identity Database 175, and Synthetic Identity Score Generator 180 stores the synthetic identity score and/or indicators in Score Database 185.

In other embodiments, the analyzers (i.e., Connectivity Analyzer 160 and Identity Analyzer 170) store their respective derived indicators in a single database or storage element (not shown). In some cases, a single database or storage element is also used to store, for example, the user request and user data associated with the given user from Server 120, the processed user data (e.g., extracted data that has been parsed and normalized for analysis) from Data Processor 150, and the generated synthetic identity scores from Synthetic Identity Score Generator 180. Alternatively, the signals or data received or generated by each component (e.g., Data Processor 150, Connectivity Analyzer 160, Identity Analyzer 170, and Synthetic Identity Score Generator 180) are stored in separate databases or storage elements as depicted in FIG. 1. The manner of storage or type of storage elements used to house or store received, derived, or generated indicators, signals, or data can vary and different storage configurations can be used without limiting the scope of the disclosed system and method.

Figure 2:
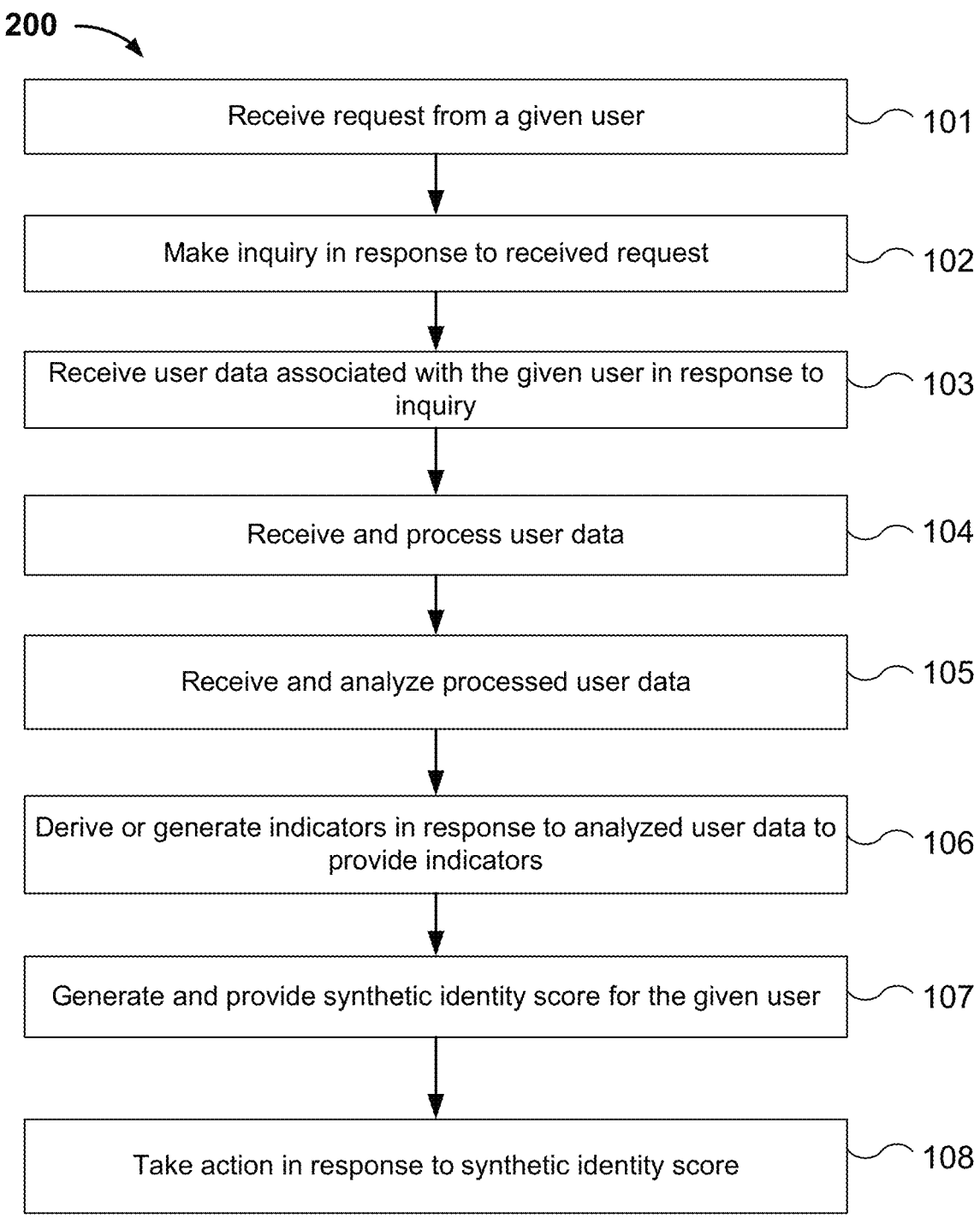
FIG. 2 is a flowchart depicting an embodiment of a method for detecting synthetic identities as performed by the exemplary embodiment of the system of FIG. 1.

FIG. 2 is a flowchart depicting an embodiment of a method for detecting synthetic identities as performed by the exemplary embodiment of the system of FIG. 1. As shown in FIG. 2, the method 200 includes receiving a user request from a given user at 101. In the example shown, the user request is an application for a consumer service from a given user received by Server 120 of FIG. 1.

At 102 of FIG. 2, an inquiry is made in response to the received user request. In the example shown in FIG. 1, the inquiry is a request by Server 120 to Third Party 130 for information associated with or related to the given user in order to inform a decision regarding the user request.

At 103 of FIG. 2, user data associated with the given user is received in response to the inquiry, which includes for example, information associated with or related to the given user including, for example, collected or monitored user activity and historical user data, in order to inform a decision regarding the user request. In the example shown in FIG. 1, the user data is received by Server 120 from Third Party 130.

At 104 of FIG. 2, the user request and user data associated with the given user are received and processed. In the example shown in FIG. 1, the user request and user data associated with the given user are received and processed by Data Processor 150, which is a component of Risk Engine 140. Here, processing includes parsing and normalizing data to extract the data in a form that can be received and analyzed by Connectivity Analyzer 160 and Identity Analyzer 170.

At 105 of FIG. 2, the processed user data (e.g., extracted data that has been parsed and normalized for analysis) is received and analyzed.

At 106 of FIG. 2, indicators are derived or generated in response to the analyzed data. In the example shown in FIG. 1, Connectivity Analyzer 160 derives and provides collective connectivity indicators configured to capture patterns manifested in a group of similar applicants to the given user. For example, using a layered graph network of linked users as will be described in more detail below, Connectivity Analyzer 160 analyzes clusters of users that are similar in certain respects to the given user or connected or linked in some way to the given user.

In some embodiments, in a complementary process conducted before, after, or in parallel to the steps performed by Connectivity Analyzer 160, Identity Analyzer 170 derives and provides individual identity indicators relating to the given user's individual characteristics or behavior. For example, Identity Analyzer 170 reconstructs a score progression (e.g., a credit score progression) configured to capture patterns in the given user's individual behavior to derive or generate individual identity indicators.

At 107 of FIG. 2, a synthetic identity score is generated and provided for the given user, the synthetic identity score indicating a likelihood that the given user is using a synthetic identity to conduct activities. In some embodiments, machine learning techniques are applied to generate the synthetic identity score, for example, by using derived indicators or other extracted or derived signals or features obtained from analyzing the processed data. In the example shown in FIG. 1, Synthetic Identity Score Generator 180 generates a synthetic identity score and provides the generated synthetic identity score to Server 120 at 107.

At 108 of FIG. 2, an action is taken based on or in response to the synthetic identity score. In some examples, Risk Engine 140 provides to Server 120 both the synthetic identity score and the indicators used to generate the synthetic identity score. In these examples, an action can be taken based on or in response to the derived indicators (e.g., the collective connectivity indicators and/or the individual identity indicators) and/or the synthetic identity score.

In the credit application example introduced above, a given user is a consumer seeking to apply for credit or a loan from a financial institution such as a bank. Here, Server 120 is the bank's server and Third Party 130 is a credit bureau. The system 100 of FIG. 1 is triggered at 110 by the consumer who initiates an event by submitting a user request for credit from the bank at 101. Bank Server 120 receives the credit request and makes an inquiry at 102 to Credit Bureau 130, requesting for information associated with or related to the consumer (e.g., the consumer's credit report) in order to inform a decision regarding the consumer's credit request. In response to the inquiry received at 102, Credit Bureau 130 provides the consumer's credit report, which is received at 103 by Bank Server 120. Bank Server 120 passes or sends the credit request and the consumer's credit report received from Credit Bureau 130 to Risk Engine 140.

As shown in FIG. 1, the credit request, CIP information (i.e. name, date of birth, SSN, and billing address) and the consumer's credit report are received at 104 by Data Processor 150, which extracts and processes user data associated with the consumer from the credit request, CIP information, and the consumer's credit report. At 105, the processed user data associated with the consumer is received and analyzed by Connectivity Analyzer 160 and Identity Analyzer 170. At 106, indicators are derived or generated in response to the analyzed data and are provided to Score Generator 180. At 107, Score Generator 180 generates a synthetic identity score in response to the indicators and provides the score to Bank Server 120. In some embodiments, Score Generator 180 applies machine learning techniques to generate the synthetic identity score, for example, by using derived indicators or other extracted or derived signals or features obtained from analyzing the processed data. Finally, at 108, Bank Server 120 receives the score, which can be used to determine a credit risk associated with the consumer applicant and to inform what actions to take based on the associated credit risk that the consumer applicant may use the synthetic identity to perform a bad act. A bad act in this case includes, for example, taking out a large loan or large sum of money based on a credit line with no intention of making any payments back to the bank.

In some embodiments, Score Generator 180 provides both the synthetic identity score and the indicators to Bank Server 120. In these embodiments, Server 120 receives the score and the indicators, which are used to determine a risk associated with the given user and to inform what actions to take based on the associated risk that the given user may use the synthetic identity to perform a bad act.

Turning to FIG. 2 with respect to the credit application example, a method 200 for detecting synthetic identities includes receiving a user request for credit from a consumer at 101 (which is received for example by Bank Server 120 of FIG. 1).

At 102 of FIG. 2, Bank Server 120 makes an inquiry in response to the received credit request. In the example of FIG. 1, the inquiry is a request by Bank Server 120 to Credit Bureau 130 for information associated with or related to the consumer (e.g., a credit report) in order to inform a decision regarding the credit request.

At 103 of FIG. 2, user data associated with the consumer is received in response to the Bank Server's inquiry, which includes for example, the consumer's credit report. In the example of FIG. 1, the consumer's credit report is received by Bank Server 120 from Credit Bureau 130.

At 104 of FIG. 2, user data associated with the consumer including in this case, CIP information associated with the consumer and the consumer's credit report are received and processed by Data Processor 150 as shown in FIG. 1, which is a component of Risk Engine 140. Processing includes parsing and normalizing data to extract features or attributes in a form that can be received and analyzed by Connectivity Analyzer 160 and Identity Analyzer 170. Parsing and normalizing are needed, for example, in the case where formats of credit applications and credit reports differ as received from different Credit Bureaus. Moreover, because credit reports are highly customizable, certain features or attributes may not be available in a given credit report or data may be missing. Processing the received data ensures that the extracted features or attributes are in a form that can be received and analyzed by the disclosed system.

Accordingly, at 105 of FIG. 2, the processed user data (e.g., data extracted from the CIP information and the consumer's credit report that has been parsed and normalized for analysis) is received and analyzed.

At 106 of FIG. 2, indicators are derived or generated in response to the analyzed data. In the example of FIG. 1, Connectivity Analyzer 160 derives and provides collective connectivity indicators configured to capture patterns manifested in a group of similar credit applicants as compared with the consumer who made the credit request. For example, using a layered graph network of linked users as will be described in more detail below, Connectivity Analyzer 160 analyzes clusters of credit users that are similar in certain respects to the consumer who made the credit request or connected or linked in some way to the consumer.

In some embodiments, in a complementary process conducted before, after, or in parallel to the steps performed by Connectivity Analyzer 160, Identity Analyzer 170 derives and provides individual identity indicators relating to consumers' individual characteristics or behavior. For example, Identity Analyzer 170 reconstructs a credit score progression configured to capture patterns in the consumer's individual behavior based on the consumer's credit history or historical record of tradelines to derive or generate individual identity indicators for the consumer.

At 107 of FIG. 2, a synthetic identity score is generated and provided for the consumer who made the credit request, the synthetic identity score indicating a likelihood that the consumer is using a synthetic identity to conduct activities. In some embodiments, machine learning techniques are applied to generate the synthetic identity score, for example, by using derived indicators or other extracted or derived signals or features obtained from analyzing the processed data. In the example shown in FIG. 1, Synthetic Identity Score Generator 180 generates a synthetic identity score and provides the generated synthetic identity score to Bank Server 120 at 107.

At 108 of FIG. 2, an action is taken based on or in response to the synthetic identity score. In some examples, Risk Engine 140 provides to Bank Server 120 both the synthetic identity score and the indicators used to generate the synthetic identity score. In these examples, an action can be taken based on or in response to the indicators (e.g., the collective connectivity indicators and/or the individual identity indicators) and/or the synthetic identity score. The action includes, for example, approving or declining the consumer's credit request based on or in response to the consumer's synthetic identity score, submitting the request for back office review or further investigation before making a final decision, or asking the customer for additional information or to supply additional supplementary evidence (such as completing the Social Security Administration's SSA-89 form) to verify their identity.

Figure 3A:
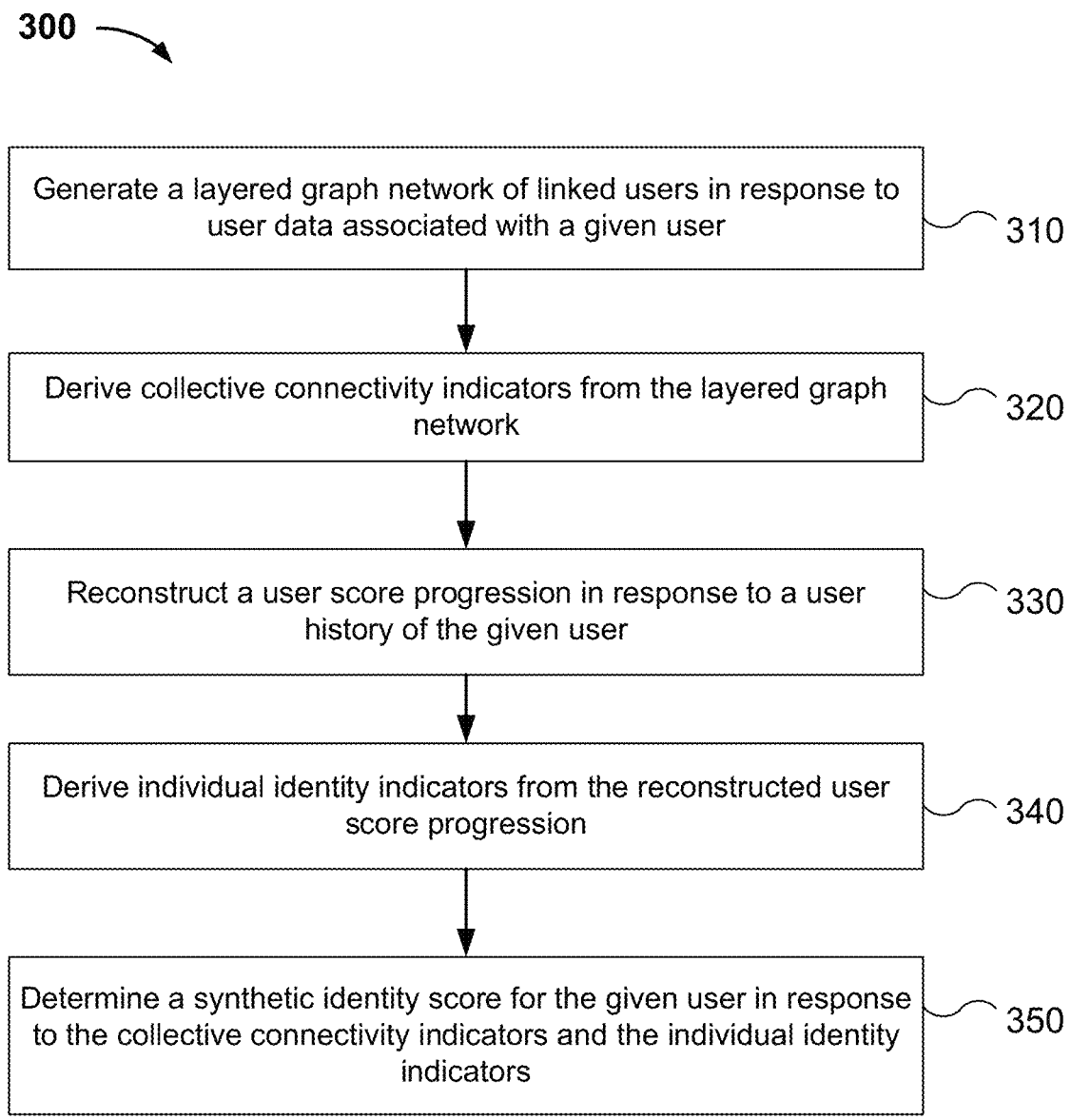
FIG. 3A is a flowchart depicting an embodiment of a method for detecting synthetic identities as performed by an exemplary system such as Risk Engine 140 of FIG. 1.

FIG. 3A is a flowchart depicting an embodiment of a method for detecting synthetic identities as performed by an exemplary system such as Risk Engine 140 of FIG. 1. As shown in FIG. 3A and as will be described in more detail below, an exemplary method 300 includes: generating a layered graph network of linked users in response to user data associated with a given user at 310, deriving collective connectivity indicators from the layered graph network at 320, reconstructing a user score progression in response to a user history of the given user at 330, deriving individual identity indicators from the reconstructed user score progression at 340, and determining or generating a synthetic identity score for the given user in response to the collective connectivity indicators and the individual identity indicators at 350. The synthetic identity score determined or generated at 350 indicates a likelihood that the given user is using a synthetic identity to conduct activities. In some embodiments, machine learning techniques are applied to determine or generate the synthetic identity score, for example, by using derived indicators or other extracted or derived signals or features obtained from analyzing the processed data.

Figure 3B:
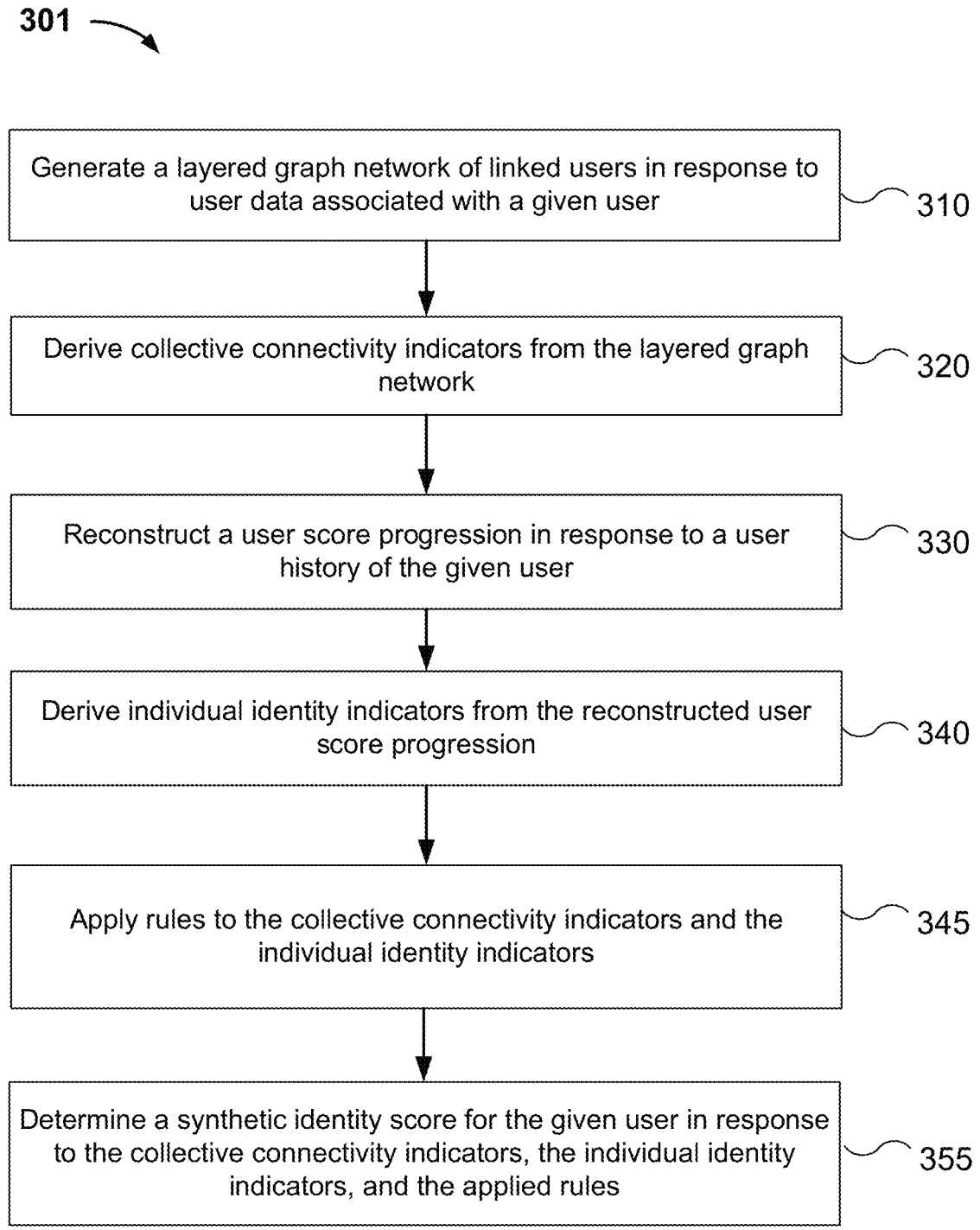
FIG. 3B is a flowchart depicting another embodiment of a method for detecting synthetic identities as performed by an exemplary system such as Risk Engine 140 of FIG. 1.

FIG. 3B is a flowchart depicting another embodiment of a method for detecting synthetic identities as performed by an exemplary system such as Risk Engine 140 of FIG. 1. Similar to method 300, the exemplary method 301 of FIG. 3B includes: generating a layered graph network of linked users in response to user data associated with a given user at 310, deriving collective connectivity indicators from the layered graph network at 320, reconstructing a user score progression in response to a user history of the given user at 330, and deriving individual identity indicators from the reconstructed user score progression at 340. Method 301 additionally includes, as will be described in more detail below, applying rules to the collective connectivity indicators and the individual identity indicators at 345 and determining a synthetic identity score for the given user in response to the collective connectivity indicators, the individual identity indicators, and the applied rules at 355. The synthetic identity score determined at 355 indicates a likelihood that the given user is using a synthetic identity to conduct activities. In some embodiments, machine learning techniques are applied to determine or generate the synthetic identity score, for example, by using derived indicators or other extracted or derived signals or features obtained from analyzing the processed data.

The user data in methods 300 and 301 depicted in FIGS. 3A and 3B can include collected or monitored user activity and historical user data. In the example of FIGS. 1 and 2, the user data includes the data sent by Server 120 and received by Data Processor 150 (a component of Risk Engine 140), which in this case includes the user request and the requested information received from Third Party 130.

In the credit application example as described with respect to FIGS. 1 and 2, the user data includes the data sent by Bank Server 120 to Data Processor 150 (a component of Risk Engine 140), which can receive the user data via an API. In some embodiments, Bank Server 120 is a database management system residing on the cloud and accessed via the internet. Alternatively Bank Server 120 is an on-premises server residing in a data center located at a customer or institution such as a bank.

User data received by Data Processor 150 includes the credit request, CIP information, and the consumer's credit report. The credit request can also include application level data or user supplied information associated with an application such as a user's name, date of birth, social security number, phone number, billing address, email address, employer's address, income, and whether a residence is owned or rented. User data can also include information collected from the user during the application process, such as for example, data related to the device used to submit the credit request such as a device fingerprint or an IP address associated with the submission. Examples of application level data and other user data collected from the user during the application process are provided in Table 1 below.

TABLE 1

Examples of Application Level User Data

Customer ID
Customer created timestamp
Application ID
Application created timestamp
First name supplied by customer
Last name supplied by customer
DOB supplied by customer
SSN supplied by customer
Billing address street1 supplied by customer
Billing address street2 supplied by customer
Billing address city supplied by customer
Billing address state supplied by customer
Billing address zip code supplied by customer
Alternate address street1 supplied by customer (optional)
Alternate address street2 supplied by customer (optional)
Alternate address city supplied by customer (optional)
Alternate address state supplied by customer (optional)
Alternate address zip code supplied by customer (optional)
Email supplied by customer
Phone number supplied by customer
Device ID used by customer (optional, if collected)
IP address used by customer (optional, if collected)
Limit or loan amount requested by customer (optional, if collected)
Product the user applied for
Credit report source, (one of "Transunion," "Experian," or "Equifax")

Data Processor 150 processes the received user data by parsing and normalizing the received user data. Taking the credit application example, Data Processor 150 processes user data such as a credit application and a credit report by parsing and normalizing the credit application and the credit report to extract relevant features or attributes as captured by different fields (e.g., a user's name, date of birth, social security number, phone number, billing address, email address, employer's address, income, and whether a residence is owned or rented). Here, the processed data including extracted features or attributes is stored in Application Database 155 of FIG. 1. In addition to or in the alternative, certain features or attributes such as addresses extracted from user data are stored in a geospatial database in order to capture geospatial relationships as will be described in further detail below.

In some embodiments, the methods 300 and 301 shown in FIGS. 3A and 3B are performed by an exemplary system such as Risk Engine 140 depicted in FIG. 1. In particular, various components of Risk Engine 140 are used to perform the steps of methods 300 and 301. In the example shown in FIG. 1, Connectivity Analyzer 160 performs step 310 of FIGS. 3A and 3B by generating the layered graph network of linked users in response to user data associated with the given user, which are received and processed by Data Processor 150 at step 104. Connectivity Analyzer 160 also performs step 320 of FIGS. 3A and 3B by deriving collective connectivity indicators from the layered graph network.

In some cases, in a complementary process conducted before, after, or in parallel to the steps performed by Connectivity Analyzer 160, Identity Analyzer 170 reconstructs a user score progression in response to a user history of the given user (step at 330 of FIGS. 3A and 3B) and derives individual identity indicators from the reconstructed user score progression respectively (step at 340 of FIGS. 3A and 3B).

Finally, in some embodiments, Synthetic Identity Score Generator 180 performs step 350 of exemplary method 300 by determining a synthetic identity score for the given user in response to the collective connectivity indicators and the individual identity indicators. In other embodiments, Synthetic Identity Score Generator 180 performs steps 345 and 355 of exemplary method 301 by applying rules to the collective connectivity indicators and the individual identity indicators (step at 345 of FIG. 3B) and determining a synthetic identity score for the given user in response to the collective connectivity indicators, the individual identity indicators, and the applied rules (step at 355 of FIG. 3B). In some cases, machine learning techniques are applied to determine or generate the synthetic identity score, for example, by using derived indicators or other extracted or derived signals or features obtained from analyzing the processed data.

As mentioned previously, by deriving indicators both from a collective (e.g., a group of similar users) and from an individual user, the unconventional approach disclosed herein is specifically tailored to identify, process, and analyze the types of data that hold the most predictive value for detecting synthetic identities by incorporating an understanding of how synthetic identities are created and maintained and how synthetic identity fraud is typically perpetrated. Using collective connectivity indicators and individual identity indicators derived from different types (e.g., collective and individual types) of user data, the disclosed system and method are able to exploit the existence of patterns that occur across presumably different users in groups of similar applicants to a given user (who may be using a synthetic identity) and patterns that occur in data on an individual level representing the individual behavior of the given user (who may be using a synthetic identity). This approach recognizes the tendency for a synthetic identity fraudster or a synthetic identity fraudster ring to conduct activities using multiple synthetic identities, which is evidenced in patterns that can be found in user data corresponding to presumably different users (but created by the same bad actor) that share certain attributes. Additionally, the individual behavior of a synthetic identity differs from a legitimate identity due to the synthetic identity fraudster's need to establish a good historical record for the synthetic identity in an expedited manner.

Accordingly, to detect patterns that occur across different users in groups of similar applicants to a given user, the disclosed system and method generates a layered graph network of linked users configured to capture a group of similar applicants in response to user data associated with a given user. In some embodiments, a fuzzy clustering technique to soft-link users and a hard clustering technique to hard-link users is applied to generate the layered graph network of linked users.

Hard linking will link users who share an attribute exactly. For example, taking a subset of user attributes such as a social security number, a concatenation of a first and last name and date of birth, a billing address, an alternate address, an email address, a phone number, and a device identifier—a hard link to a given user will take the given user (who just submitted a user request such as an application for credit) and will find all other previous users or applicants who share any of these user attributes exactly. The concern with only relying on hard linkages is that the more sophisticated synthetic identity fraudsters will be able to evade hard linking or hard clustering techniques by changing user data associated with a synthetic identity even slightly. For example, a synthetic identity fraudster will provide different names, phone numbers, addresses, or devices for the synthetic identities so that there is no hard link to another synthetic identity the fraudster has created.

To address this concern and to provide a more robust approach for detecting synthetic identities, in addition to hard linking, the disclosed technique uses soft linking or soft clustering in order to find connections between users who share some attributes that are similar but not identical. Generating a layered network graph using soft linking and hard linking to form layers or clusters of users who are connected or linked to a given user is described in further detail with respect to the following figures.

Figure 4A:
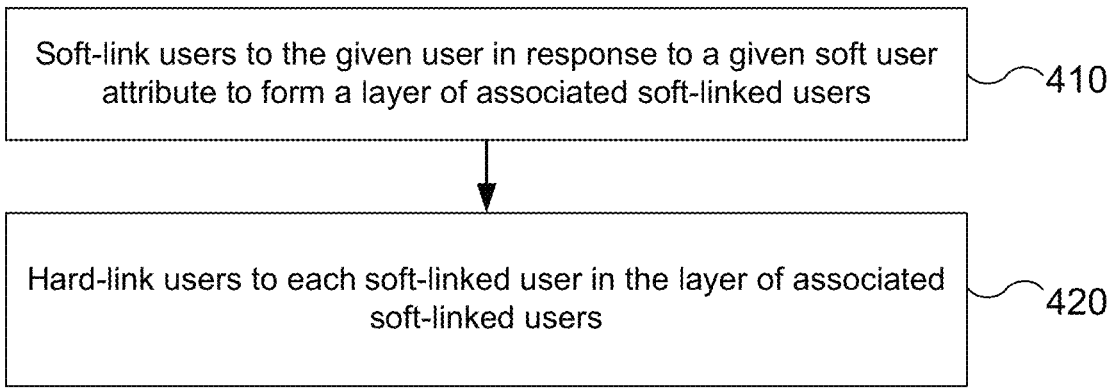
FIG. 4A is a flowchart illustrating additional steps included in an exemplary process of generating a layered graph network of linked users in response to user data associated with a given user.

FIG. 4A is a flowchart illustrating additional steps included in an exemplary process 310 of generating a layered graph network of linked users in response to user data associated with a given user. As shown in FIG. 4A, the process 310 includes soft-linking users to the given user in response to a given soft user attribute to form a layer of associated soft-linked users at 410. In this case, each soft-linked user in the layer of associated soft-linked users has one degree of separation from the given user. The process 310 also includes hard-linking users to each soft-linked user in the layer of associated soft-linked users to form a secondary layer of associated hard-linked users at 420. Here, each hard-linked user in the secondary layer of associated hard-linked users has two degrees of separation from the given user. As described in more detail below, in some embodiments, a fuzzy clustering technique is applied to soft-link users and a hard clustering technique is applied to hard-link users to generate the layered graph network of linked users.

Figure 4B:
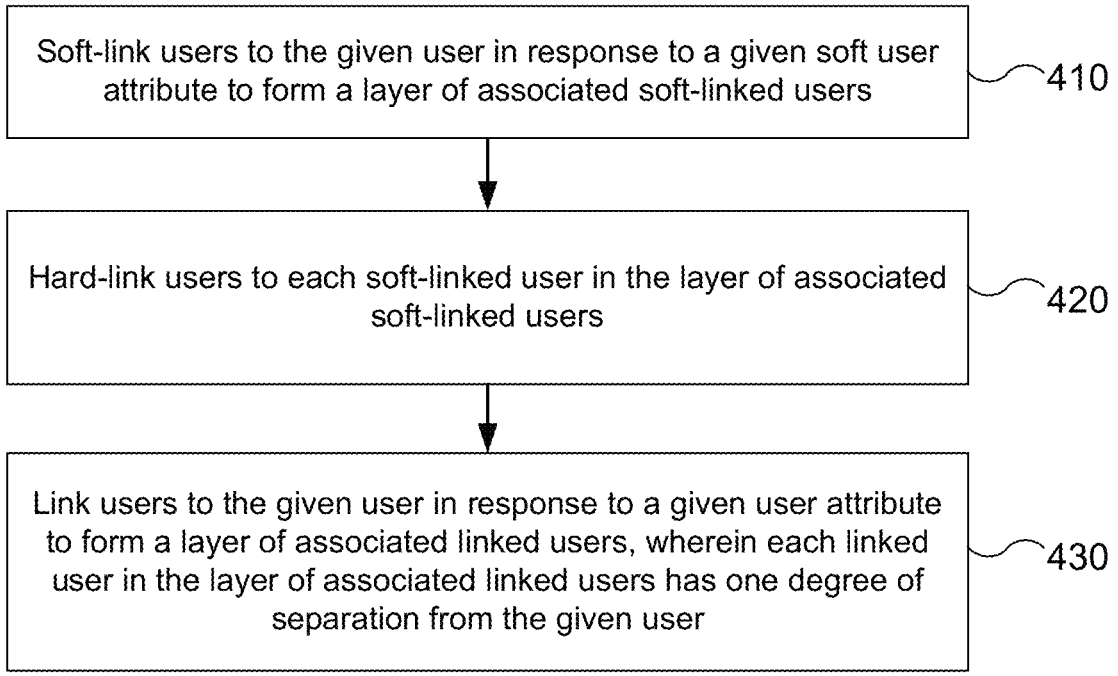
FIG. 4B is a flowchart illustrating another example of additional steps included in an exemplary process of generating a layered graph network of linked users in response to user data associated with a given user.

FIG. 4B is a flowchart illustrating another example of additional steps included in an exemplary process 310 of generating a layered graph network of linked users in response to user data associated with a given user. As shown in FIG. 4B, in addition to steps 410 and 420 described above with respect to FIG. 4A, the exemplary process 310 in this case also includes linking users to the given user in response to a given user attribute to form a layer of associated linked users at 430. In the example shown, each linked user in the layer of associated linked users has one degree of separation from the given user. In some embodiments, linking users to the given user in response to a given user attribute at 430 is performed by hard-linking users to the given user in response to a given hard user attribute, wherein each hard-linked user in the layer of associated linked users has one degree of separation from the given user. As described in more detail below, a fuzzy clustering technique is applied to soft-link users and a hard clustering technique is applied to hard-link users to generate the layered graph network of linked users.

FIG. 4C is a flowchart illustrating additional steps included in an exemplary process 310 to generate additional layers in the layered graph network of linked users as described herein. As shown in FIG. 4C, in addition to steps 410 and 420 described above with respect to FIGS. 4A and 4B, the exemplary process 310 in this case also includes hard-linking users to the given user in response to a given hard user attribute to form a layer of associated hard-linked users at 435. In the example shown, each hard-linked user in the layer of associated hard-linked users has one degree of separation from the given user. Additionally, for each linked user in a given layer having two or more degrees of separation from the given user, the process 310 includes linking additional users to each linked user in the given layer to form a subsequent layer of subsequently associated linked users to the linked users in the given layer at 440. In some embodiments, the layered graph network comprises a plurality of subsequent layers generated by recursively hard-linking additional users to linked users in the layered network in response to a set of shared hard attributes. In other examples, subsequent layers are generated by recursively soft-linking additional users to linked users in the layered network in response to a set of shared soft attributes.

A technique of generating a layered graph network according to the disclosed system and method by linking users to form layers of associated linked users will now be described with respect to the following figures.

Figure 5:
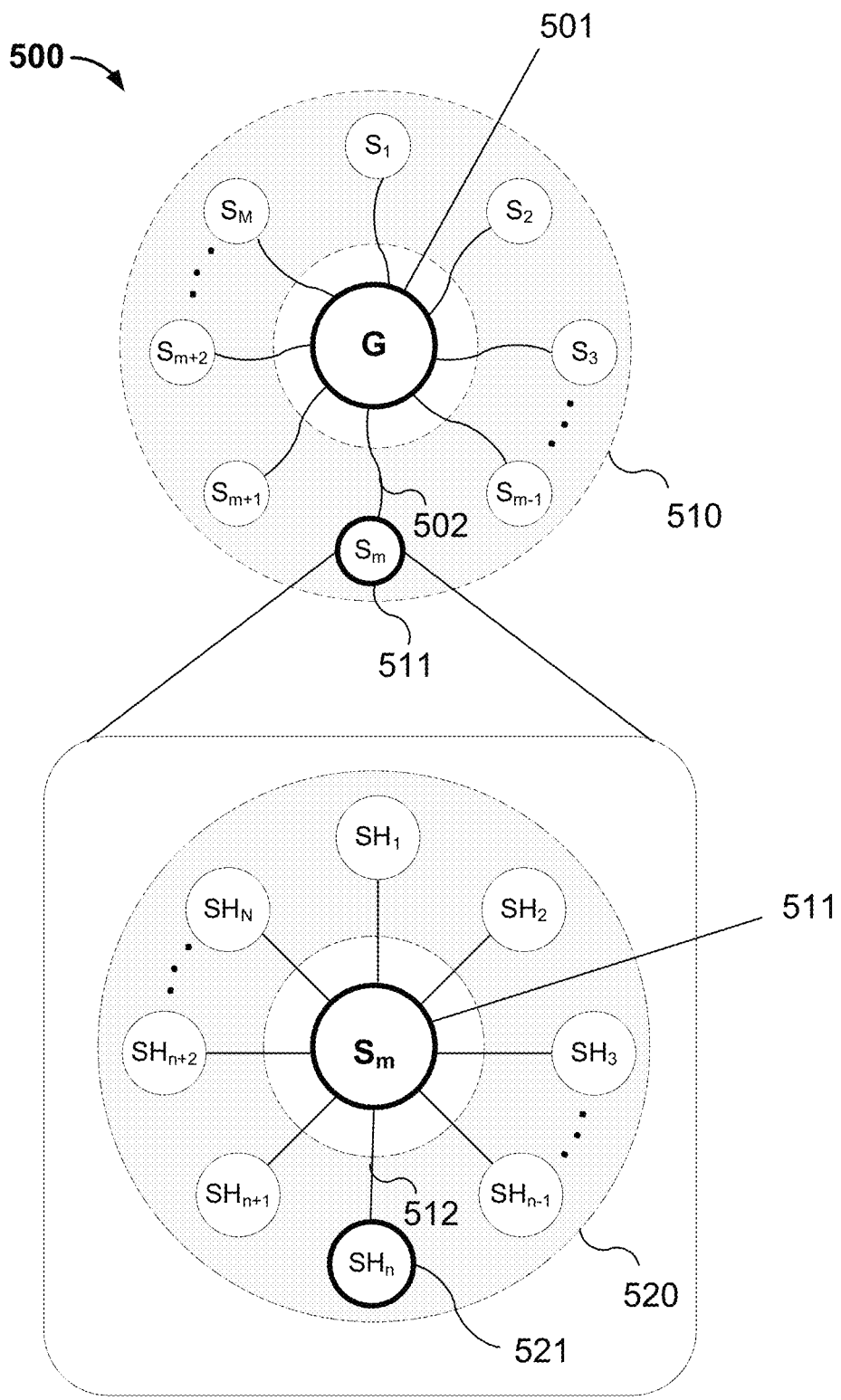
FIG. 5 illustrates a block diagram of an example of a layered graph network of linked users generated by the system and method as described herein.

FIG. 5 illustrates a block diagram of an example of a layered graph network of linked users generated by the system and method as described herein. In the example shown, layered graph network 500 includes a number M of soft-linked users denoted by nodes $S_1$ through $S_M$ respectively, each soft-linked user in the set $\{S_1, S_2, S_3 \ldots S_M\}$ being soft-linked to a given user G at 501 in response to a given soft user attribute to form a layer of associated soft-linked users at 510. In this case, each soft-linked user in the layer of associated soft-linked users has one degree of separation from the given user. In particular, as shown in FIG. 5, each soft-linked user in the layer of associated soft-linked users has a direct link to the given user G at 501. For example, a particular soft-linked user (e.g., the mth soft-linked user, denoted by $S_m$ at 511) is directly linked via a soft-link at 502 to the given user G at 501.

The layered graph network of linked users shown in FIG. 5 also includes a number N of hard-linked users denoted by nodes $SH_1$ through $SH_N$ respectively, each hard-linked user in the set $\{SH_1, SH_2, SH_3 \ldots SH_N\}$ being hard-linked to a particular soft-linked user (e.g., $S_m$ at 511) in the layer of associated soft-linked users. The set of hard-linked users $\{SH_1, SH_2, SH_3 \ldots SH_N\}$ forms a secondary layer of associated hard-linked users at 520. Note that here, each hard-linked user in the secondary layer of associated hard-linked users at 520 is directly linked to a particular soft-linked user (e.g., $S_m$ at 511), and in turn, each particular soft-linked user in the layer of associated soft-linked users at 510 is directly linked to the given user G at 501. Thus, each hard-linked user in the secondary layer of associated hard-linked users at 520 has two degrees of separation from the given user. Note also that although FIG. 5 shows the expansion of the layered graph network via a secondary layer formed by hard-linking users to a particular soft-linked user $S_m$ at 511, the secondary layer includes all such hard-linked users to any of the soft-linked users in the layer of associated soft-linked users (e.g., in this case, the set $\{S_1, S_2, S_3 \ldots S_M\}$). In other words, the expansion of the layered graph network includes secondary layers formed by hard-linking users to each of the soft-linked users $\{S_1, S_2, S_3 \ldots S_M\}$ in the layer of associated soft-linked users at 510.

Note that, while not explicitly shown in FIG. 5, each particular node denoting a user in a given layer can be expanded upon by linking (e.g., soft-linking or hard-linking) additional users to the particular node to form yet another layer of associated linked users. Moreover, each subsequently formed layer will have one more degree of separation from the given user as compared with the particular node that is the source of expansion. For example, the layered graph network of FIG. 5 can be further expanded by linking additional users to a particular hard-linked user (e.g., the nth hard-linked user denoted by $SH_n$ at 521), which in turn, is hard-linked at 512 to a particular soft-linked user $S_m$ at 511, which is soft-linked at 502 to the given user G at 501. This expansion forms a subsequent layer (not shown) wherein all of the users in the subsequent layer are directly linked to $SH_n$ at 521, the subsequent layer having three degrees of separation (i.e., one more degree than $SH_n$ at 521, which has two degrees of separation) from the given user G at 501.

The layered graph network of linked users shown in FIG. 5 also includes a number N of hard-linked users denoted by nodes $SH_1$ through $SH_N$ respectively, each hard-linked user in the set $\{SH_1, SH_2, SH_3 \ldots SH_N\}$ being hard-linked to a particular soft-linked user (e.g., $S_m$ at 511) in the layer of associated soft-linked users. The set of hard-linked users $\{SH_1, SH_2, SH_3 \ldots SH_N\}$ forms a secondary layer of associated hard-linked users at 520. Note that here, each hard-linked user in the secondary layer of associated hard-linked users at 520 is directly linked to a particular soft-linked user (e.g., $S_m$ at 511), and in turn, each particular soft-linked user in the layer of associated soft-linked users at 510 is directly linked to the given user G at 501. Thus, each hard-linked user in the secondary layer of associated hard-linked users at 520 has two degrees of separation from the given user. Note also that although FIG. 5 shows the expansion of the layered graph network via a secondary layer formed by hard-linking users to a particular soft-linked user $S_m$ at 511, the secondary layer includes all such hard-linked users to any of the soft-linked users in the layer of associated soft-linked users (e.g., in this case, the set $\{S_1, S_2, S_3 \ldots S_M\}$). In other words, the expansion of the layered graph network includes secondary layers formed by hard-linking users to each of the soft-linked users $\{S_1, S_2, S_3 \ldots S_M\}$ in the layer of associated soft-linked users at 510.

Figure 6:
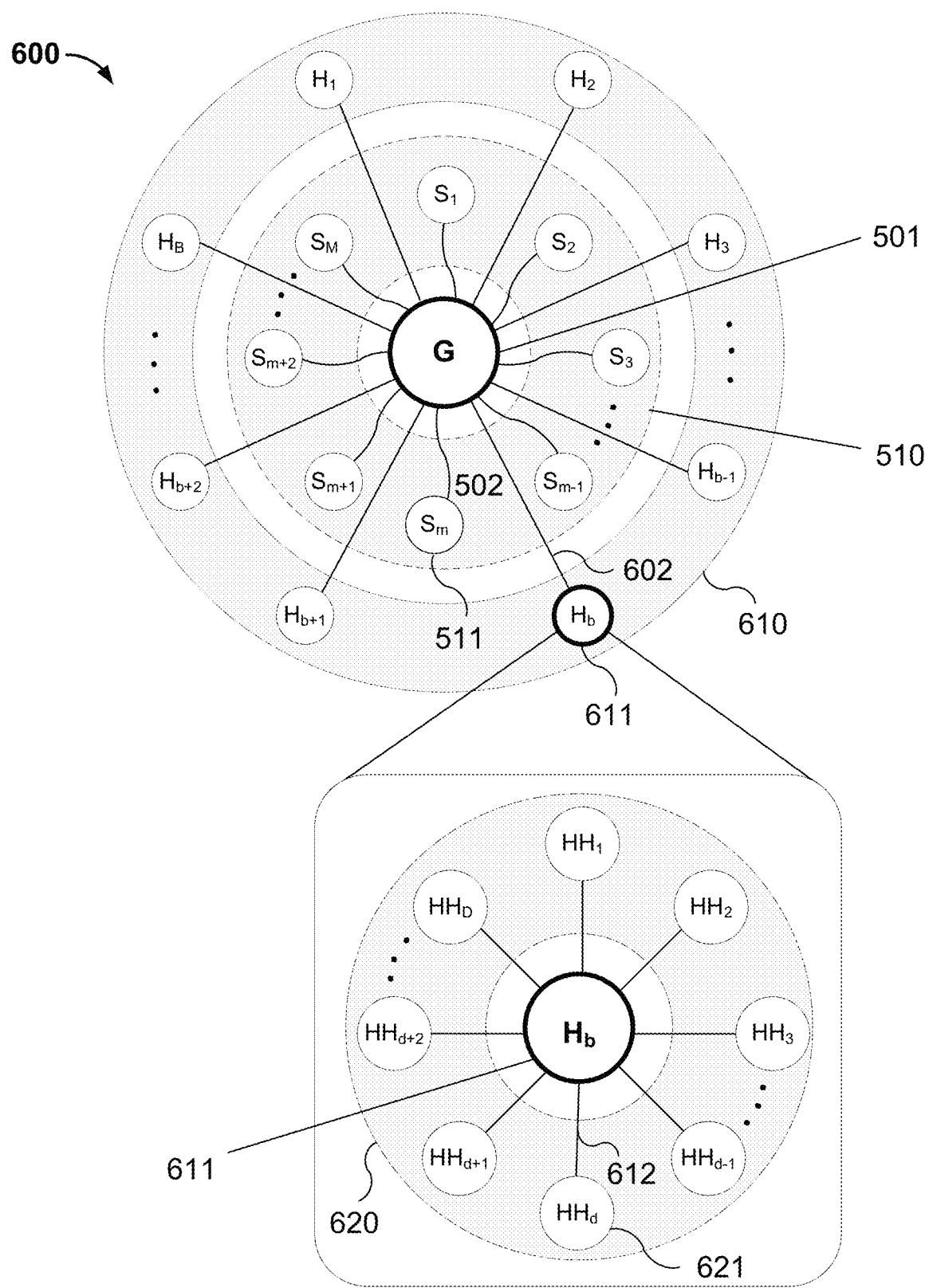
FIG. 6 illustrates a block diagram of another embodiment of a layered graph network of linked users generated by the system and method as described herein.

FIG. 6 illustrates a block diagram of another embodiment of a layered graph network of linked users generated by the system and method as described herein. In particular, in some embodiments, a given layer of linked users denoting a particular degree of separation from the given user in the layered graph network includes both soft-linked users and hard-linked users. As shown in FIG. 6, this particular example of a layered graph network 600 includes two primary layers each having one-degree of separation from the given user G at 501. The two primary layers shown in FIG. 6 include the layer of associated soft-linked users $\{S_1, S_2, S_3 \ldots S_M\}$ at 510 as described above with respect to FIG. 5, and a second layer of a number B of associated hard-linked users $\{H_1, H_2, H_3 \ldots H_B\}$ at 610. The layer of associated hard-linked users at 610 is formed by directly hard-linking each of the users in the set $\{H_1, H_2, H_3 \ldots H_B\}$ to the given user G at 501. Thus, like the soft-linked users in the layer of associated soft-linked users $\{S_1, S_2, S_3 \ldots S_M\}$ at 510, each hard-linked user in the layer of associated hard-linked users $\{H_1, H_2, H_3 \ldots H_B\}$ at 610 has one degree of separation from the given user G at 501.

FIG. 5 depicts how the layered graph network 500 can be expanded via secondary layers by hard-linking users to each soft-linked user in the layer of associated soft-linked users to form a secondary layer of associated hard-linked users, for example as shown at 520. In a similar manner, FIG. 6 shows how the layered graph network 600 can be expanded by hard-linking users to each hard-linked user in the layer of associated hard-linked users at 610 to form a secondary layer of associated hard-linked users at 620.

More specifically, the layered graph network of linked users shown in FIG. 6 also includes a number D of hard-linked users denoted by nodes $HH_1$ through $HH_D$ respectively, each hard-linked user in the set $\{HH_1, HH_2, HH_3 \ldots HH_D\}$ being hard-linked to a particular hard-linked user (e.g., the bth hard-linked user denoted by $H_b$ at 611) in the layer of associated hard-linked users at 610. The set of hard-linked users $\{HH_1, HH_2, HH_3 \ldots HH_D\}$ thus forms a secondary layer of associated hard-linked users at 620. Note that here, each hard-linked user in the secondary layer of associated hard-linked users at 620 is directly linked to a particular hard-linked user (e.g., $H_b$ at 611), and in turn, each particular hard-linked user in the layer of associated hard-linked users at 610 is directly linked to the given user G at 501. Thus, each hard-linked user in the secondary layer of associated hard-linked users at 620 has two degrees of separation from the given user. Note also that although FIG. 6 shows the expansion of the layered graph network via a secondary layer formed by hard-linking users to a particular hard-linked user $H_b$ at 611, the secondary layer at 620 includes all such hard-linked users to any of the hard-linked users in the layer of associated hard-linked users (e.g., in this case, the set $\{H_1, H_2, H_3 \ldots H_B\}$). In other words, the expansion of the layered graph network includes secondary layers formed by hard-linking users to each of the hard-linked users $\{H_1, H_2, H_3 \ldots H_B\}$ in the layer of associated hard-linked users at 610.

As described above with respect to FIG. 5, note that, while not explicitly shown in FIG. 6, each particular node denoting a user in a given layer can be expanded upon by linking (e.g., soft-linking or hard-linking) additional users to the particular node to form yet another layer of associated linked users. Moreover, each subsequently formed layer will have one more degree of separation from the given user as compared with the particular node that is the source of expansion. For example, the layered graph network of FIG. 6 can be further expanded by linking additional users to a particular hard-linked user (e.g., the dth hard-linked user denoted by $HH_d$ at 621), which in turn is hard-linked at 612 to a particular hard-linked user $H_b$ at 611, which is hard-linked at 602 to the given user G at 501. This expansion forms a subsequent layer (not shown) wherein all of the users in the subsequent layer are directly linked to $HH_d$ at 621, the subsequent layer having three degrees of separation (i.e., one more degree than $HH_d$ at 621, which has two degrees of separation) from the given user G at 501.

Figure 7:
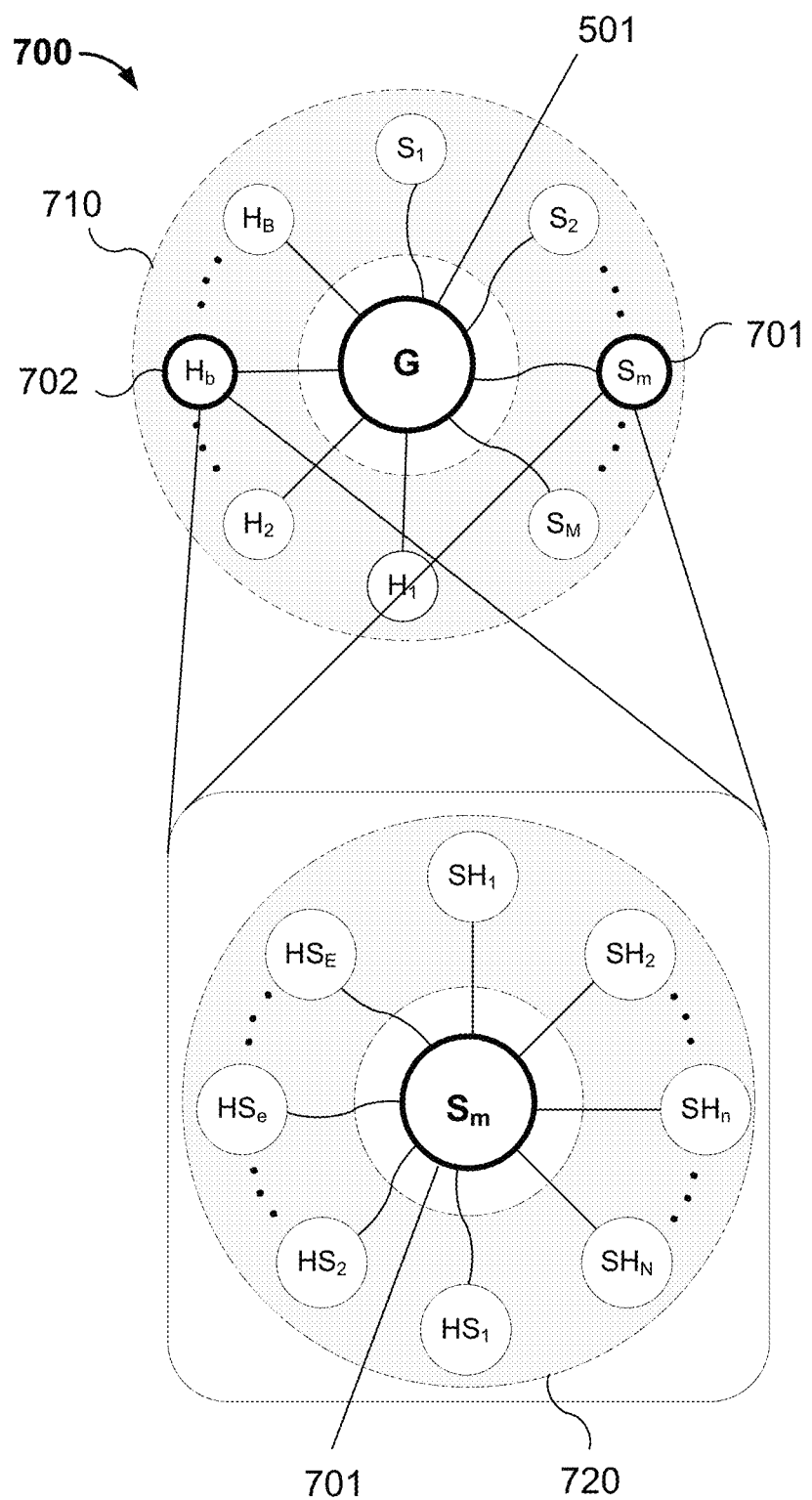
FIG. 7 presents another depiction of a layered graph network showing how a particular node denoting a user in a given layer can be expanded upon by linking additional users to the particular node to form a layer of associated linked users.

FIG. 7 presents another depiction of a layered graph network showing how a particular node denoting a user in a given layer can be expanded upon by linking additional users to the particular node to form a layer of associated linked users. The layered graph network 700 includes both soft-linked and hard-linked users in a given layer of associated linked users, wherein the given layer includes users having the same degree of separation from the given user. In the example shown, a number M of soft-linked users is denoted by nodes $S_1$ through $S_M$ respectively, wherein each of the soft-links is formed by directly soft-linking each soft-linked user in the set $\{S_1, S_2, S_3 \ldots S_M\}$ to a given user G at 501 in response to a given soft user attribute. Similarly, a number B of hard-linked users is denoted by nodes $H_1$ through $H_B$ respectively, wherein each of the hard-links being formed by directly hard-linking each user in the set $\{H_1, H_2, H_3 \ldots H_B\}$ to the given user G at 501 in response to a given hard user attribute. Taken together, the sets $\{S_1, S_2, S_3 \ldots S_M\}$ of soft-linked users and $\{H_1, H_2, H_3 \ldots H_B\}$ of hard-linked users form a layer 710 of associated linked users to the given user, each being directly linked to and having one degree of separation from the given user G at 501.

Similar to the process for expanding the layered graph networks 500 and 600 described with respect to FIGS. 5 and 6, FIG. 7 depicts how the layered graph network 700 can be expanded via secondary layers. Note that, as shown in this example, users may be either soft-linked or hard-linked to other users to form a connection that expands the layered graph network.

Here, expansion of the layered graph network 700 is performed by hard-linking users to each soft-linked user in the layer of associated linked users 710 to form a secondary layer of associated linked users, for example as shown at 720. More specifically, a number N of hard-linked users denoted by nodes $SH_1$ through $SH_N$ respectively and forming a set $\{SH_1, SH_2, SH_3 \ldots SH_N\}$ are each hard-linked to a particular soft-linked user (e.g., $S_m$ at 701) in the layer of associated linked users 710.

In this case, the layered graph network 700 of FIG. 7 is also expanded by soft-linking users to each hard-linked user in the layer 710 of associated linked users to form a secondary layer of linked users. More specifically, a number E of soft-linked users denoted by nodes $HS_1$ through $HS_E$ respectively and forming a set $\{HS_1, HS_2, HS_3 \ldots HS_E\}$ are each soft-linked to a particular hard-linked user (e.g., the bth hard-linked user denoted by $H_b$ at 702) in the layer of associated linked users at 710.

Together, the set of hard-linked users $\{SH_1, SH_2, SH_3 \ldots SH_N\}$ and the set of soft-linked users $\{HS_1, HS_2, HS_3 \ldots HS_E\}$ form a secondary layer of associated linked users at 720. Notably, each hard-linked user in the secondary layer of associated linked users at 720 is directly linked to a particular soft-linked user (e.g., $S_m$ at 701), and in turn, each soft-linked user in the layer of associated linked users at 710 is directly linked to the given user G at 501. Thus, each hard-linked user in the secondary layer of associated linked users at 720 has two degrees of separation from the given user. Similarly, each soft-linked user in the secondary layer of associated linked users at 720 is directly linked to a particular hard-linked user (e.g., $H_b$ at 702), and in turn, each hard-linked user in the layer of associated linked users at 710 is directly linked to the given user G at 501. Thus, each soft-linked user in the secondary layer of associated linked users at 720 has two degrees of separation from the given user.

The process of expanding a layered graph network by forming subsequent layers as described with respect to FIGS. 5, 6, and 7 can be repeated for each linked user in a given layer of the layered graph network by linking additional users to each linked user in the given layer to form a subsequent layer of subsequently associated linked users to the linked users in the given layer. In particular, the process can be repeated or performed recursively until no further links between users are found for any of the users in the layered graph network. Alternatively, the process can be limited by setting a threshold, for example, on the number of users to be linked in any given layer, or on the number of layers to be added to the layered graph network. As will be described in more detail below, the expansion process can also be controlled by limiting the set of soft or hard attributes that determine how linkages are formed between users, or by determining and setting a threshold on a similarity metric used for soft-linking users to each other.

Figure 8A:
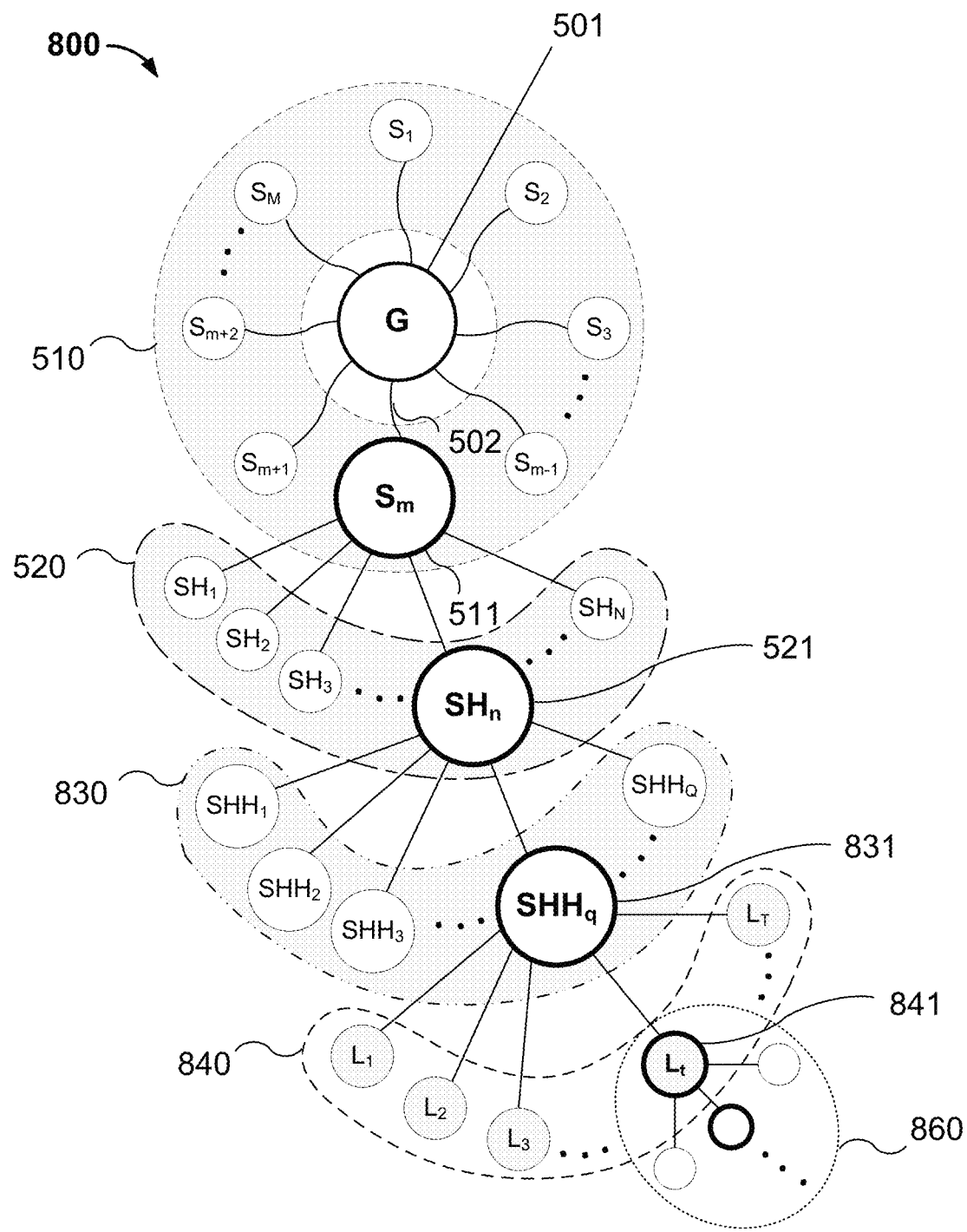
FIG. 8A illustrates how an exemplary layered graph network of linked users is expanded according to the recursive process of forming subsequent layers of users as described above.

FIG. 8A illustrates how an exemplary layered graph network of linked users is expanded according to the recursive process of forming subsequent layers of users as described above. In the example shown, the layered graph network 500 of FIG. 5 is expanded to form a layered graph network 800 by hard-linking additional users to each linked user in a given layer to form a subsequent layer of subsequently associated hard-linked users to the linked users in the given layer.

Recall that layered graph network 500 of FIG. 5 includes a number M of soft-linked users denoted by nodes $S_1$ through $S_M$ respectively, each soft-linked user in the set $\{S_1, S_2, S_3 \ldots S_M\}$ being soft-linked to a given user G at 501 in response to a given soft user attribute to form a layer of associated soft-linked users at 510. In this case, each soft-linked user in the layer of associated soft-linked users has one degree of separation from the given user. In particular, as shown in FIG. 5, each soft-linked user in the layer of associated soft-linked users has a direct link to the given user G at 501. For example, a particular soft-linked user (e.g., the mth soft-linked user, denoted by $S_m$ at 511) is directly linked via a soft-link at 502 to the given user G at 501.

Also recall that the layered graph network 500 of FIG. 5 includes a number N of hard-linked users denoted by nodes $SH_1$ through $SH_N$ respectively, each hard-linked user in the set $\{SH_1, SH_2, SH_3 \ldots SH_N\}$ being hard-linked to a particular soft-linked user (e.g., $S_m$ at 511) in the layer of associated soft-linked users. The set of hard-linked users $\{SH_1, SH_2, SH_3 \ldots SH_N\}$ forms a secondary layer of associated hard-linked users at 520. Note that here, each hard-linked user in the secondary layer of associated hard-linked users at 520 is directly linked to a particular soft-linked user (e.g., $S_m$ at 511), and in turn, each particular soft-linked user in the layer of associated soft-linked users at 510 is directly linked to the given user G at 501. Accordingly, each hard-linked user in the secondary layer of associated hard-linked users at 520 has two degrees of separation from the given user.

The layered graph network 500 of FIG. 5 includes at least a primary layer of associated linked users (e.g., a layer of associated soft-linked users to the given user), each user in the primary layer having one degree of separation from the given user, and a secondary layer of linked users (e.g., a secondary layer of associated hard-linked users to a particular soft-linked user), each user in the secondary layer having two degrees of separation from the given user. As FIG. 8A shows, the layered graph network 500 can be further expanded for each linked user in a given layer having two or more degrees of separation from the given user by linking additional users to each linked user in the given layer to form a subsequent layer of subsequently associated linked users to the linked users in the given layer.

For example, turning to FIG. 8A and taking the given layer to be the secondary layer 520, the layered graph network is expanded beyond the given layer by linking a number Q of hard-linked users denoted by nodes $SHH_1$ through $SHH_Q$ respectively, each hard-linked user in the set $\{SHH_1, SHH_2, SHH_3 \ldots SHH_Q\}$ being hard-linked to a particular hard-linked user (e.g., the nth hard-linked user, denoted by $SH_n$ at 521) in the secondary layer 520 (now the given layer). The set of hard-linked users $\{SHH_1, SHH_2, SHH_3 \ldots SHH_Q\}$ forms a subsequent layer of associated hard-linked users at 830, wherein each user in the subsequent layer 830 has one degree of separation more than the particular user in the given layer (in this case, $SH_n$ at 521 in layer 520). Accordingly, each hard-linked user in the set $\{SHH_1, SHH_2, SHH_3 \ldots SHH_Q\}$ in the subsequent layer at 830 has three degrees (one degree more than the users in the secondary layer 520) of separation from the given user at 501.

In the example of FIG. 8A as described thus far, subsequent layers beyond the first soft-linked layer at 510 are formed by hard-linking additional users to a particular user in a given layer. In some embodiments, however, subsequent layers are formed by soft-linking additional users to a particular user in a given layer. Additionally, as described with respect to FIG. 7, users in a subsequent layer can be either soft-linked or hard-linked to users in a previously formed layer of the layered graph network.

The process of expanding a layered graph network by forming subsequent layers as described above is repeated for each linked user in a given layer. Returning to the example of FIG. 8A, taking the most recently formed layer of users at 830 as the given layer, the layered graph network is expanded beyond the given layer by linking a number T of users denoted by nodes $L_1$ through $L_T$ respectively, each linked user in the set $\{L_1, L_2, L_3 \ldots L_T\}$ being linked to a particular hard-linked user (e.g., the qth hard-linked user, denoted by $SHH_q$ at 831) in the tertiary layer 830 (now the given layer).

The set of linked users $\{L_1, L_2, L_3 \ldots L_T\}$ forms a subsequent layer of associated linked users at 840, wherein each user in the subsequent layer 840 has one degree of separation more than the particular user in the given layer (in this case, $SHH_q$ at 831 in layer 830). Accordingly, each linked user in the set $\{L_1, L_2, L_3 \ldots L_T\}$ in the subsequent layer at 840 has four degrees (one degree more than the users in the tertiary layer 830) of separation from the given user at 501. The process is repeated by taking the most recently formed layer at 840 as the given layer and expanding the layered graph network beyond the given layer by linking a number of users to a particular user (e.g., $L_T$ at 841 in the given layer 840).

The process of expanding a layered graph network by forming subsequent layers as described above is repeated at 860 for each linked user in a given layer, each time taking the given layer is the most recently formed layer. In this manner, as shown in FIG. 8A, the layered graph network 800 comprises a plurality of subsequent layers generated by recursively linking additional users to linked users in the layered network in response to a set of shared attributes. The recursive linking can be soft-linking or hard-linking. In some embodiments, the first layer formed is a layer of associated soft-linked users or a combination of associated soft-linked and hard-linked users, with subsequent layers formed thereafter being hard-linked to the users in the first layer.

Figure 8B:
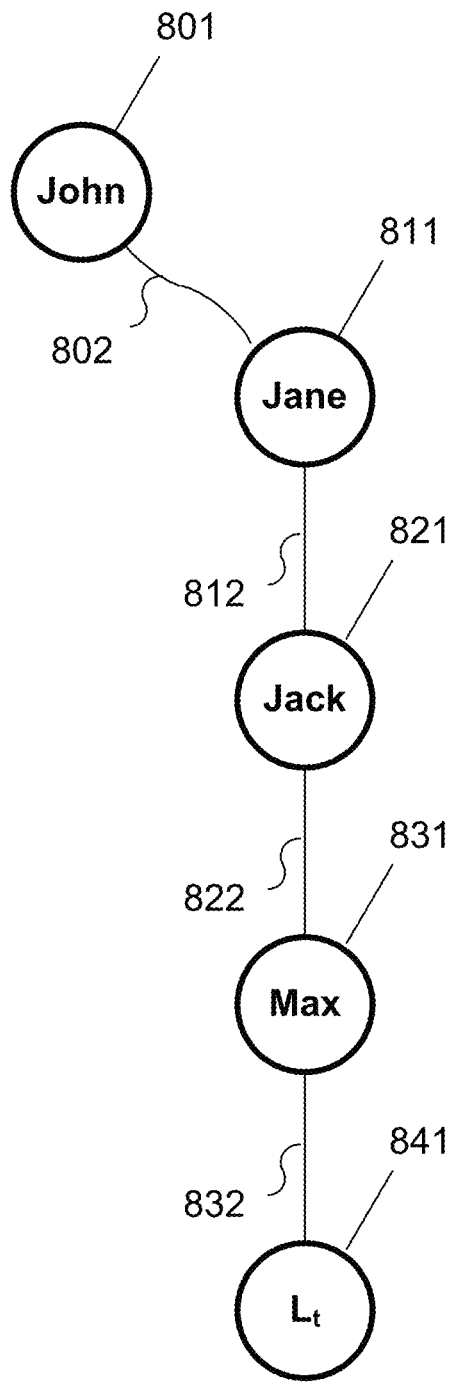
FIG. 8B depicts a block diagram of a simple example of a portion of the layered graph network of linked users of FIG. 8A.

FIG. 8B depicts a block diagram of a simple example of a portion of the layered graph network of linked users of FIG. 8A. In the example shown, a portion of the layered graph network 800 includes a given user John 801. A soft-linked user Jane 811 is soft-linked to the given user John 801 in response to a given soft user attribute, for example, an address. In particular, Jane's address is determined to be within two miles of John's address, and Jane's credit request is determined as submitted within 6 months of John's credit request. In this case, Jane's similarity score to John based on a geospatial proximity (e.g., a distance between Jane's address and John's address) and a temporal proximity (e.g., an age of Jane's address as compared with John's address as determined from a submission time of each of their user requests or applications) is within the 100 highest scores (not shown) of soft-linked user candidates to John 801. Here, in response to Jane's similarity score, the system (e.g., Address Analyzer 1110 of FIG. 11, which will be described in further detail below) will select to soft-link Jane to John via a soft-link at 802. In this example, Jane has one degree of separation from John and is directly linked to John via the soft-link at 802 based on a similarity of her address to John's address.

FIG. 8B also depicts a second user, who in this case is a hard-linked user, Jack 821, who shares a hard user attribute with soft-linked user Jane 811. In this case, the hard user attribute is a phone number, which Jack 821 and Jane 811 have in common. Thus, Jack 821 is directly linked to Jane 811 via the hard-link at 812 based on an exact match of Jack's phone number to Jane's phone number.

In the example shown, subsequent layers beyond the first soft-linked layer Jane 811 are formed by hard-linking additional users to a particular user in a given layer. In particular, FIG. 8B depicts a third hard-linked user, Max 831 who shares a hard attribute with hard-linked user Jack 821, for example, a social security number. Accordingly, Max 831 is directly linked to Jack 821 via the hard-link at 822 based on an exact match of Max's social security number to Jack's social security number. The process of linking additional users to form subsequent layers is repeated, in this case by hard-linking another user to Max based on a shared hard attribute such as a phone number (e.g., linking Max 831 to $L_T$ at 841 via a hard-link at 832), and can continue by linking additional users to $L_T$ at 841 and repeating the process in a recursive fashion.

Returning to FIG. 8A and applying the present example, John is a given user (shown in FIG. 8A at 501) and Jane is a member (shown in FIG. 8A at 511) of a primary layer of associated soft-linked users (shown in FIG. 8A at 510). Each associated soft-linked user in the primary layer 510, including Jane, is directly linked to and has one degree of separation from the given user John.

Additionally in this example, Jack is a member (shown in FIG. 8A at 521) of a secondary layer of associated hard-linked users (shown in FIG. 8A at 520). Each associated hard-linked user is directly linked to a particular soft-linked user—in this case, the hard-linked user Jack is hard-linked to the soft-linked user Jane, who in turn, is linked to the given user John. Accordingly, as a hard-linked user in the secondary layer of associated hard-linked users (shown in FIG. 8A at 520), Jack has two degrees of separation from the given user John.

Further expanding the layered graph network in this example, Max is a member (shown in FIGS. 8A and 8B at 831) of a tertiary layer of associated hard-linked users (shown in FIG. 8A at 830). Each associated hard-linked user is directly linked to a particular hard-linked user—in this case, the hard-linked user Max is hard-linked to the hard-linked user Jack, who is hard-linked to the soft-linked user Jane, who is soft-linked to the given user John. Accordingly, as a hard-linked user in the tertiary layer of associated hard-linked users (shown in FIG. 8A at 830), Max has three degrees of separation from the given user John.

Subsequent layers beyond the tertiary layer (shown in FIG. 8A at 830) that includes Max are formed by hard-linking additional users to a particular user in a given layer. In the example shown, another user $L_T$ (shown in FIGS. 8A and 8B at 841) is hard-linked to Max based on a shared phone number (e.g., shown in FIG. 8B by linking Max 831 to $L_T$ at 841 via a hard-link at 832). This process of expanding the layered graph network can continue by linking additional users to $L_T$ at 841 and repeating the process in a recursive fashion.

In some embodiments, a layered graph network of linked users is generated in response to user data associated with a given user by first soft-linking users to the given user in response to a given soft user attribute to form a layer of associated soft-linked users followed by hard-linking users to each soft-linked user in the layer of associated soft-linked users to form a secondary layer of associated hard-linked users. Here, soft-linking is performed as an initial step to generate a primary layer of associated soft-linked users, wherein each of the soft-linked users in the primary layer has one degree of separation from the given user. Subsequent layers beyond the primary layer are generated via hard-linking users to other users that are in the layered graph network. This approach is taken in order to reduce a computational complexity associated with generating the layered graph network, recognizing that soft-linking requires more computational resources and is more computationally intensive as compared to hard-linking. Accordingly, in these embodiments, the soft-linking process is performed once and only with respect to the given user in order to generate the layered graph network.

A fuzzy clustering technique applied to soft-link users to generate a layered graph network of linked users will now be described with respect to the following figures.

Figure 9A:
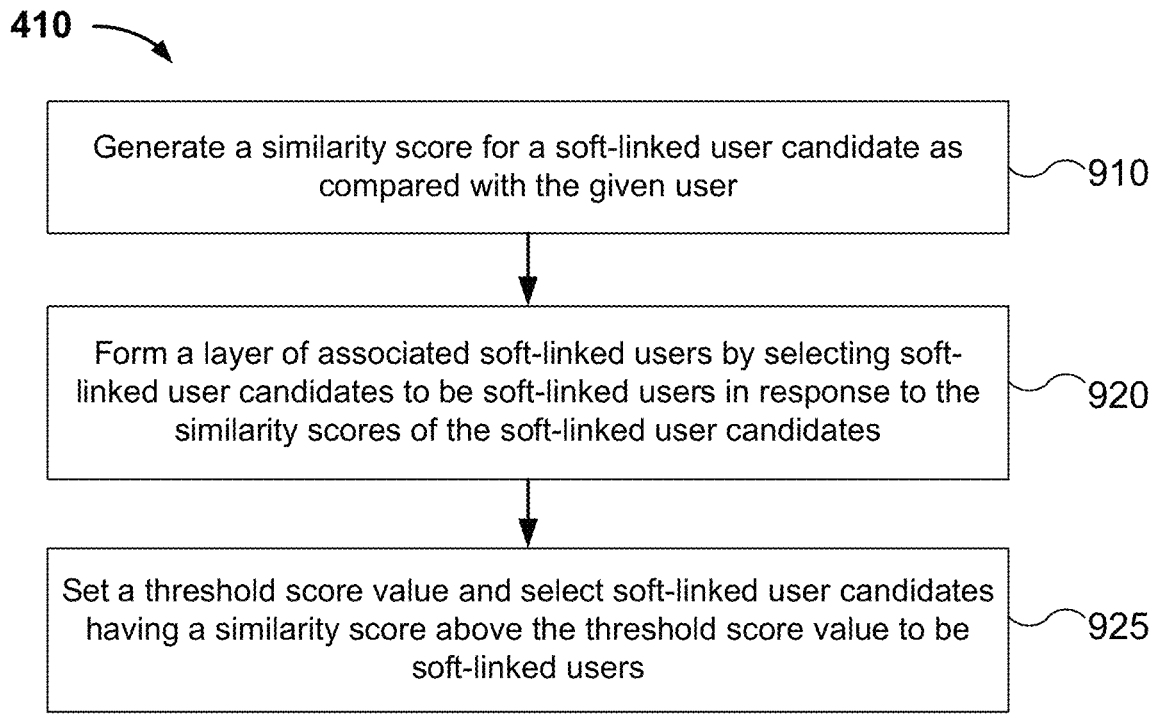
FIGS. 9A and 9B are flowcharts illustrating an exemplary method of soft-linking users to a given user in response to a given soft user attribute to form a layer of associated soft-linked users.

FIG. 9A is a flowchart illustrating an exemplary method 410 of soft-linking users to a given user in response to a given soft user attribute to form a layer of associated soft-linked users. In the example shown, a fuzzy clustering technique is used to generate a similarity score for a soft-linked user candidate as compared with the given user. For soft linkages, a similarity metric can be defined for a particular attribute and soft-linking two users according to how similar their respective values are for the particular attribute, where the similarity of values is determined by the similarity metric. A similarity score is determined that captures how closely a soft-linked user candidate matches the given user by comparing values of a particular soft user attribute of the soft-linked user candidate versus the given user, where the closeness of the match is measured using the similarity metric. For example, if the soft user attribute is an address, a similarity metric of distance between two locations is used to measure the closeness or geospatial proximity of the address of the soft-linked user candidate and the address of the given user. A similarity score for the soft-linked user candidate is determined based on or in response to the distance between the location of the address of the soft-linked user candidate and the location of the address of the given user.

Figure 9B:
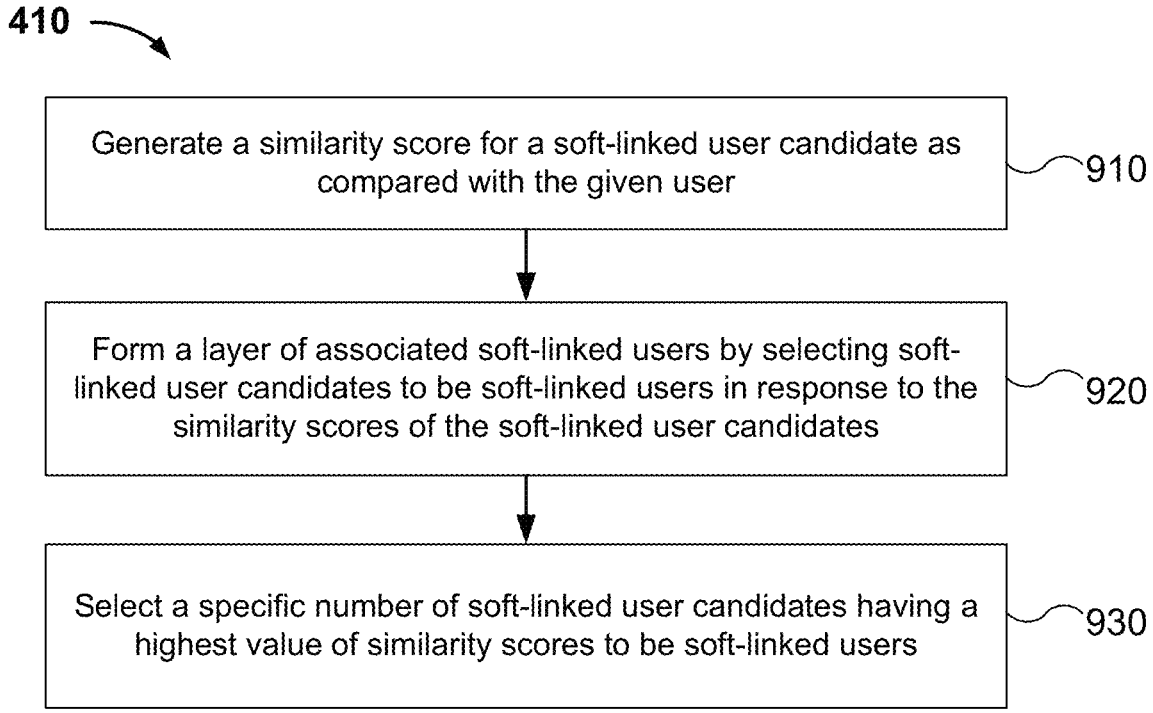

Returning to FIG. 9A, the step of soft-linking users to a given user in response to a given soft user attribute to form a layer of associated soft-linked users (e.g., shown in FIGS. 4A-4C at 410) includes: generating a similarity score for a soft-linked user candidate as compared with the given user at 910; forming a layer of associated soft-linked users by selecting soft-linked user candidates to be soft-linked users in response to the similarity scores of the soft-linked user candidates at 920; and setting a threshold score value and selecting soft-linked user candidates having a similarity score above the threshold score value to be soft-linked users at 925. In some embodiments, as shown in FIG. 9B, rather than setting a threshold score value, the method 410 selects a specific number of soft-linked user candidates having a highest value of similarity scores to be soft-linked users at 930.

A goal of soft-linking users is to form layers or clusters of unique soft-linked users that are most similar to the given user as determined by their generated similarity scores. In some embodiments, a plurality of soft user attributes is available and can be used in the process of soft-linking users to generate a layered graph network and in deriving collective connectivity indicators from the layers or clusters of soft-linked users in the layered graph network. Similarity scores generated in response to soft-linking users based on different soft user attributes can also be combined to generate a combined similarity score for a soft-linked user candidate. These embodiments are described in the following figures.

Figure 10A:
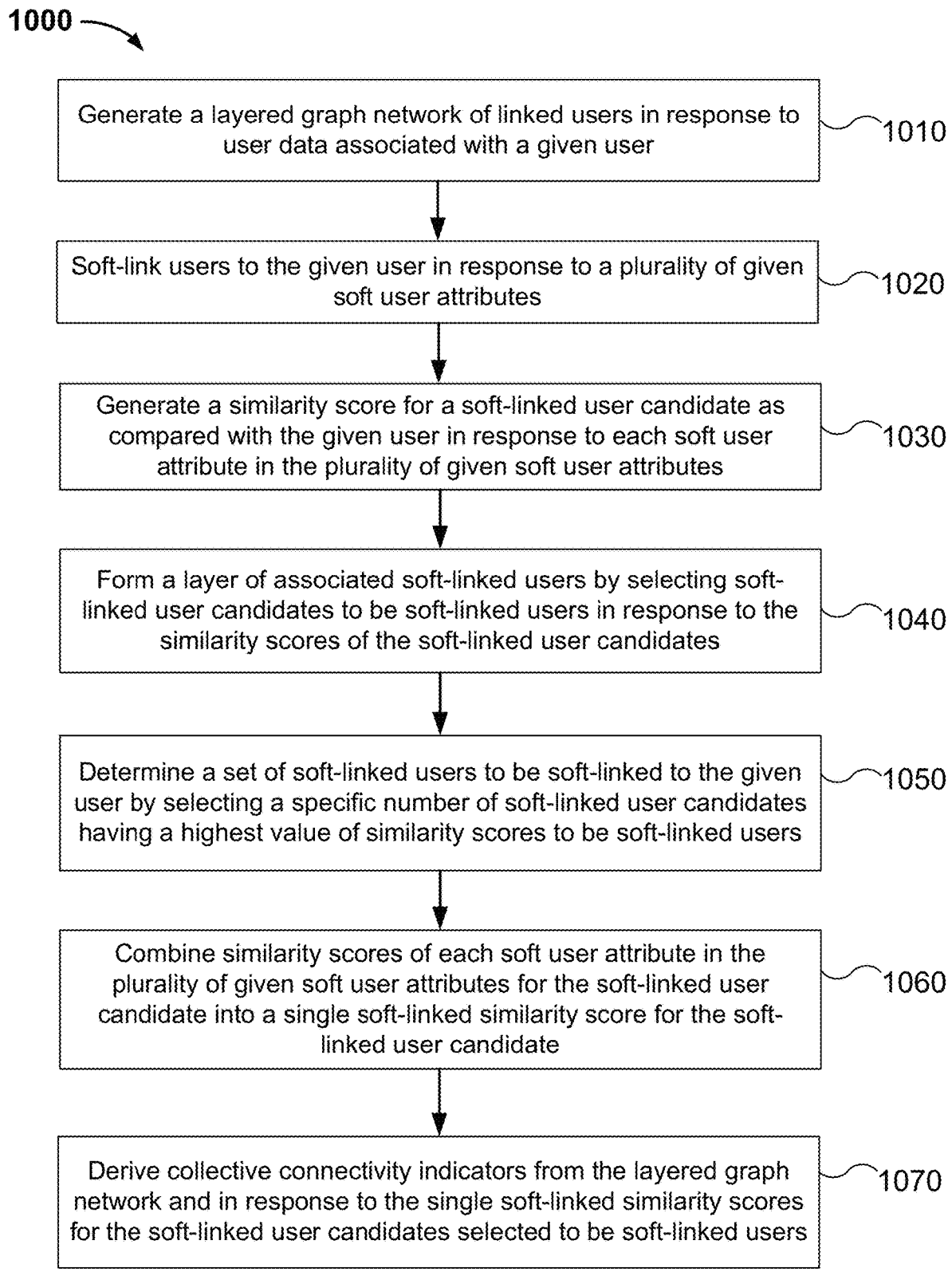
FIG. 10A is a flowchart depicting an exemplary method of soft-linking users to generate a layered graph network and deriving collective connectivity indicators from the layered graph network in response to a plurality of soft user attributes.

FIG. 10A is a flowchart depicting an exemplary method of soft-linking users to generate a layered graph network and deriving collective connectivity indicators from the layered graph network in response to a plurality of soft user attributes. In particular, as shown in FIG. 10A, the method 1000 includes generating a layered graph network of linked users in response to user data associated with a given user at 1010. In this case, as shown at step 1020, the layered graph network is generated by soft-linking users to the given user in response to a plurality of given soft user attributes. The process of soft-linking forms a layer of associated soft-linked users, wherein each soft-linked user in the layer of associated soft-linked users has one degree of separation from the given user (as described for example with respect to FIGS. 5-8B).

At 1030, the method 1000 includes generating a similarity score for a soft-linked user candidate as compared with the given user in response to each soft user attribute in the plurality of given soft user attributes. In particular, a fuzzy clustering technique is applied to determine soft linkages by defining a similarity metric for each soft user attribute in the plurality of given soft user attributes and soft-linking two users according to how similar their respective values are for each soft user attribute. A similarity score is determined that captures how closely a soft-linked user candidate matches the given user by comparing values of a particular soft user attribute of the soft-linked user candidate versus the given user, where the closeness of the match is measured using the similarity metric. For example, if the soft user attribute is an address, a similarity metric of distance between two locations is used to measure the closeness or proximity of the address of the soft-linked user candidate and the address of the given user. A similarity score for the soft-linked user candidate is determined based on or in response to the distance between the location of the address of the soft-linked user candidate and the location of the address of the given user.

At 1040, the method 1000 includes forming a layer of associated soft-linked users by selecting soft-linked user candidates to be soft-linked users in response to the similarity scores of the soft-linked user candidates. The process of forming layers to generate a layered graph network is described more fully with respect to FIGS. 4A-8B herein.

At 1050, the method 1000 includes determining a set of soft-linked users to be soft-linked to the given user by selecting a specific number of soft-linked user candidates having a highest value of similarity scores to be soft-linked users. For example, if the specific number is selected to be 100 and the soft user attribute is an address, at step 1050 the method selects the 100 soft-linked user candidates having the highest similarity scores (assuming that these scores correspond to the soft-linked user candidate addresses that are closest in distance to the given user's address). In other words, the 100 soft-linked user candidates determined to have addresses that are the 100 closest addresses in proximity to the address of the given user are selected to be added to the layered graph network as soft-linked users. Alternatively, if the similarity scores are determined such that a lower similarity score indicates a closer proximity between the soft-linked user candidate and the given user, the method selects the 100 soft-linked user candidates having the lowest similarity scores. In the case of a plurality of given soft user attributes, a specific number of soft-linked user candidates may be selected for each process of applying each soft user attribute to generate similarity scores to a set of soft-linked user candidates. In this case, collective connectivity indicators are derived from each set of soft-linked users that are soft-linked to the given user in response to each soft user attribute.

In addition or in the alternative, as shown in FIG. 10A at 1060, similarity scores of each soft user attribute in the plurality of given soft user attributes for the soft-linked user candidate are combined into a single soft-linked similarity score for the soft-linked user candidate at 1060. For example, a plurality of similarity scores generated in response to a plurality of different soft user attributes can be combined by taking a sum or weighted sum of the plurality of similarity scores, taking an average or weighted average of the plurality of similarity scores, or any other method of combining similarity scores into a single score representing a similarity of the soft-linked user candidate to the given user.

At 1070, collective connectivity indicators are derived from the layered graph network and in response to the single soft-linked similarity scores for the soft-linked user candidates selected to be soft-linked users. The system and method disclosed herein use the derived collective connectivity indicators in combination with individual identity indicators derived from an analysis of user data on an individual level to generate or determine a synthetic identity score for the given user. Machine learning techniques can be applied to generate or determine the synthetic identity score, for example, by using derived indicators or other extracted or derived signals or features obtained from analyzing the processed data.

Figure 10B:
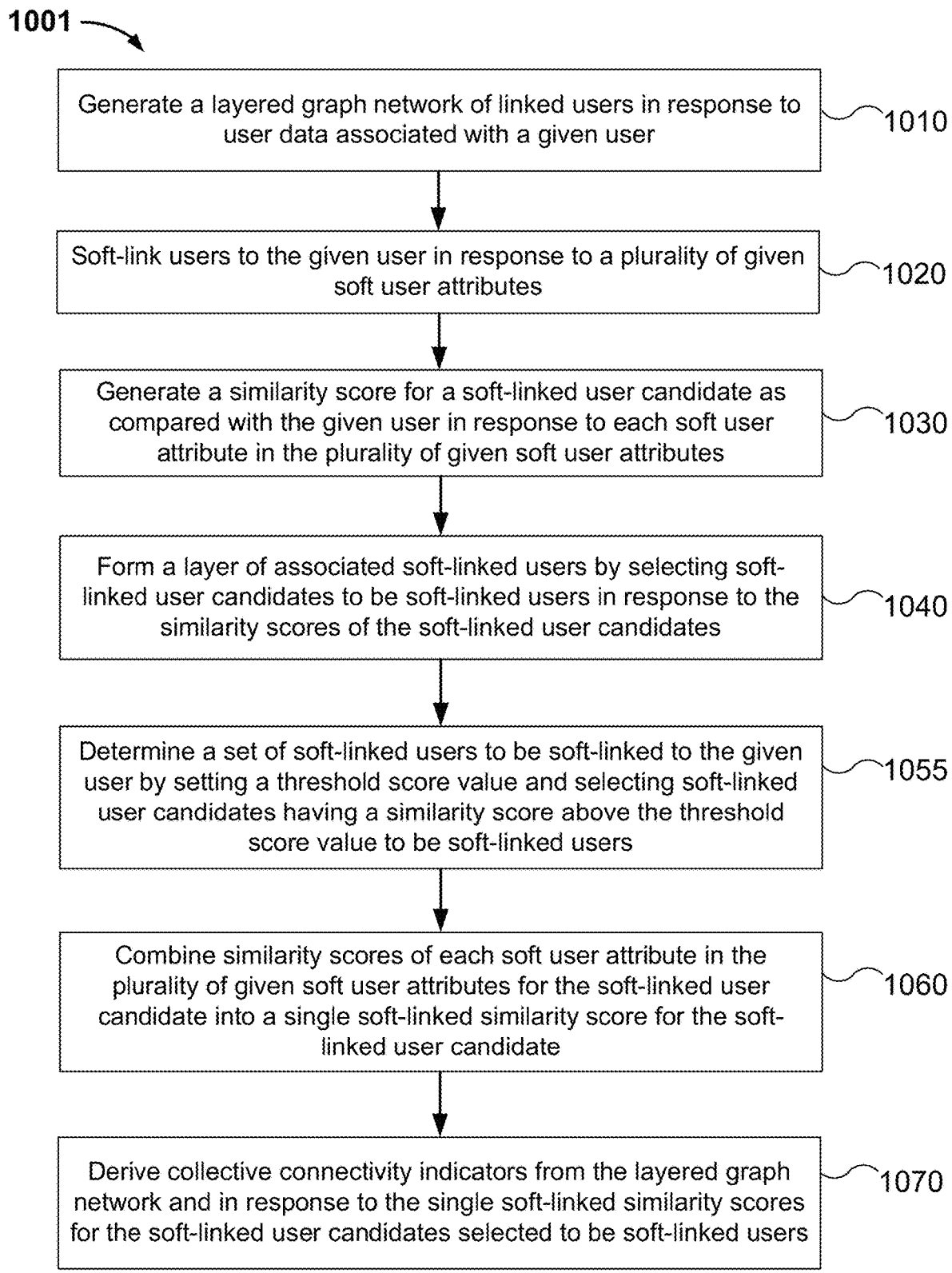
FIG. 10B is a flowchart depicting another embodiment of a method of soft-linking users to generate a layered graph network and deriving collective connectivity indicators from the layered graph network in response to a plurality of soft user attributes.

FIG. 10B is a flowchart depicting another embodiment of a method of soft-linking users to generate a layered graph network and deriving collective connectivity indicators from the layered graph network in response to a plurality of soft user attributes. In the exemplary method 1001 shown in FIG. 10B, rather than determining the set of soft-linked users to be soft-linked to the given user by selecting a specific number of a number of soft-linked user candidates having a highest value of similarity scores to be soft-linked users, the set of soft-linked users to be soft-linked to the given user is determined by setting a threshold score value and selecting soft-linked user candidates having a similarity score above the threshold score value to be soft-linked users at 1055. For example, if the soft user attribute is an address and a similarity metric of distance between two locations is used to measure the closeness or proximity of the address of the soft-linked user candidate to the address of the given user, a similarity score for the soft-linked user candidate will be higher the closer the distance is between the location of the address of the soft-linked user candidate and the location of the address of the given user. Assuming for example that the similarity scores for all such soft-linked user candidates are scaled to a value from 0 to 100, a threshold score value of 85 can be set at step 1055 of FIG. 10B and the method would then select soft-linked user candidates having a scaled similarity score above 85 to be soft-linked users.

Note that the threshold score value can be adjusted to limit or to expand the set of soft-linked users to be added to the layered graph network. Moreover, the selection of soft-linked user candidates can be based on having a similarity score that exceeds, or is equal to or exceeds the threshold score value. Alternatively, if the similarity scores are such that a lower similarity score indicates a closer similarity between the soft-linked user candidate and the given user, the selection of soft-linked user candidates can be based on having a similarity score that is less than, or equal to or less than the threshold score value. In the case of a plurality of given soft user attributes, a threshold score value may be set for each process of applying each soft user attribute to generate similarity scores for a set of soft-linked user candidates. In this case, collective connectivity indicators are derived from each set of soft-linked users that are soft-linked to the given user in response to each soft user attribute.

Other methods can also be used to determine or limit the set of soft-linked users without limiting the scope of the disclosed system for detecting synthetic identities. Moreover, different methods of determining the set of soft-linked users can be used as applied to different soft user attributes. For example, a specific number of soft-linked user candidates having a highest (or lowest) value of similarity scores are selected to be soft-linked users in response to one soft user attribute, while a threshold score value can be set and soft-linked user candidates selected having a similarity score above (or below) the threshold score value in response to another soft user attribute.

Not surprisingly, the choice of a similarity metric and process for generating a similarity score in response to the similarity metric will typically depend on the particular soft user attribute being considered as a basis for making a connection or link between users. For example, if the soft user attribute is an address, a measure of geospatial proximity or distance can be used as a similarity metric. In contrast, if the user data includes a sequence of events, the event sequence associated with a given user is considered as a soft user attribute. However, a different similarity metric will need to be applied to measure or quantify a similarity between an event sequence associated with a soft-linked user candidate and an event sequence associated with the given user. Embodiments that include using a plurality of different soft user attributes to generate a layered network graph according to the disclosed system and method for detecting synthetic identities are further described with respect to the following figures.

Figure 11:
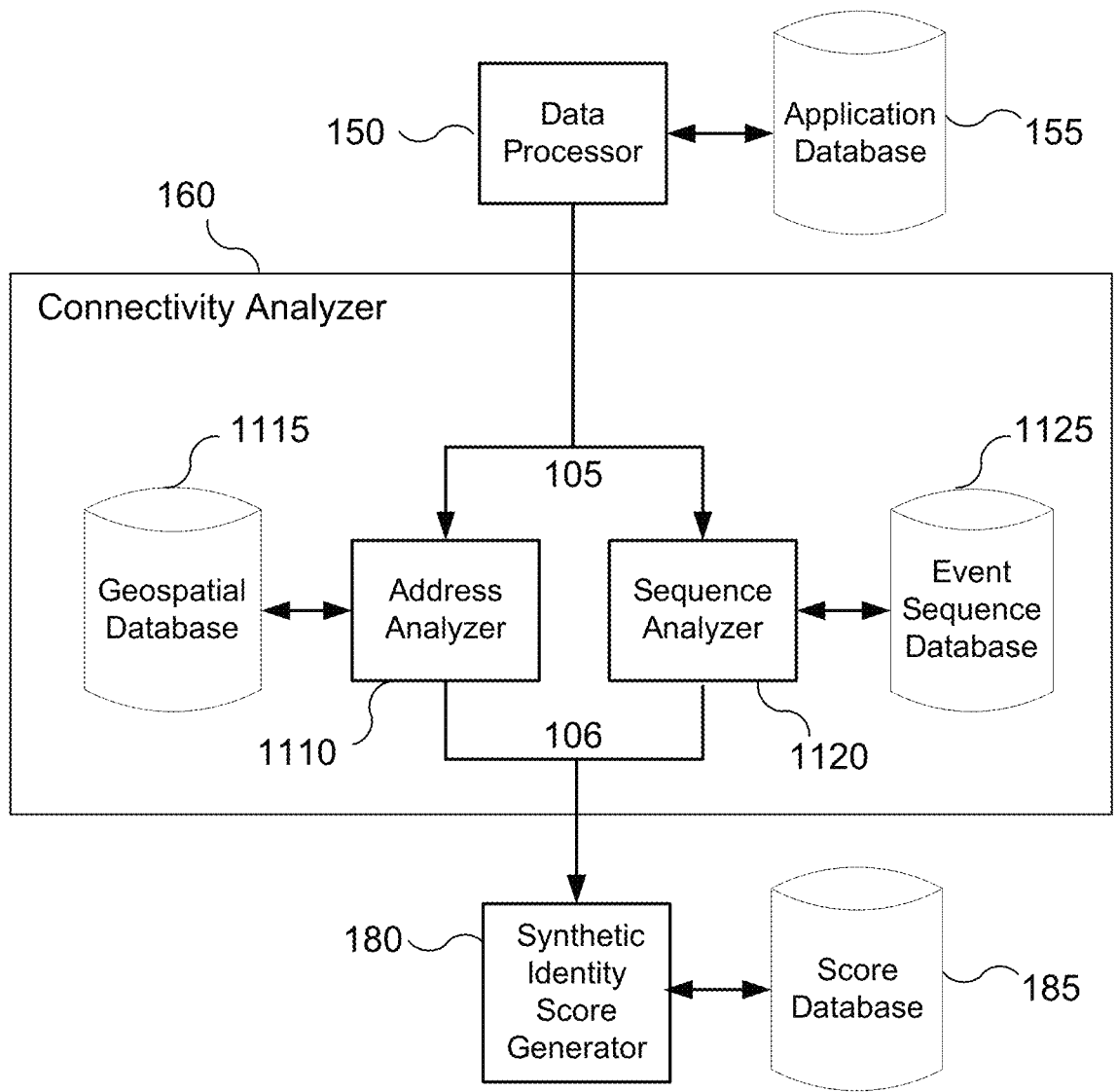
FIG. 11 is a block diagram depicting additional components in an embodiment of a system for analyzing processed user data to derive collective connectivity indicators from a layered graph network in response to a plurality of soft user attributes.

FIG. 11 is a block diagram depicting additional components in an embodiment of a system for analyzing processed user data to derive collective connectivity indicators from a layered graph network in response to a plurality of soft user attributes. In the example shown, the plurality of soft user attributes includes an address and a sequence of historical user events.

In order to analyze the plurality of soft user attributes that includes an address and a sequence of historical user events, Connectivity Analyzer 160 of FIG. 1 is shown in FIG. 11 to include Address Analyzer 1110 having access to Geospatial Database 1115, and Sequence Analyzer 1120 having access to Event Sequence Database 1125.

As described previously, Data Processor 150 processes user data received from Server 120 of FIG. 1 (not shown), in particular, by parsing and normalizing the received data. Taking the credit application example where the user request is a credit request, Data Processor 150 processes user data such as a credit application by parsing and normalizing data extracted from the credit application to extract relevant features or attributes such as addresses associated with a given user. The processed data is received at 105 by Address Analyzer 1110, which is included in Connectivity Analyzer 160.

In particular, Address Analyzer 1110 receives a given user address associated with a given user and queries Geospatial Database 1115 to identify all addresses associated with soft-linked user candidates in response to a distance between the given user address and the address associated with the soft-linked user candidates. For example, the query to Geospatial Database 1115 can request for all addresses associated with soft-linked user candidates that are within a two-mile radius of the given user address. In response to the addresses identified within the two-mile radius, Address Analyzer 1110 determines a set of nearest unique soft-linked user candidates associated with the identified addresses in Geospatial Database 1115. In particular, a deduping process can be employed to the identified addresses and their associated soft-linked user candidates in order to determine the set of nearest unique soft-linked user candidates associated with the identified addresses.

Recall that a goal of soft-linking users is to form layers or clusters of unique soft-linked users that are most similar to the given user as determined by their generated similarity scores. To this end, Address Analyzer 1110 determines an age or recency associated with each of the identified addresses and filters the set of nearest unique soft-linked user candidates associated with the identified addresses in response to the determined age or recency of each identified address. For example, identified addresses that are more recent (e.g., active within the last six months of the given user's request) are given more weight than those that are older. The weight can be non-uniform, such as an exponential decay applied to time as age increases, in order to weigh more recent addresses more heavily than older addresses. The end result is a set of nearest unique soft-linked user candidates to the given user where proximity is measured both in space (based on distances determined by querying Geospatial Database 1115) and time (based on the determined age or recency of each identified address).

Finally, Address Analyzer 1110 generates an address similarity score for each soft-linked user candidate in the set of nearest unique soft-linked user candidates in response to both the distance between or geospatial proximity of the given user address and the identified address associated with each soft-linked user candidate and the determined age, measure of recency, and temporal proximity associated with each identified address corresponding to each soft-linked user candidate.

As described previously, Data Processor 150 also processes user data received from third parties such as, for example, a credit report, by parsing and normalizing data extracted from the credit report to extract relevant features or attributes. Here, the feature or attribute is a sequence of given user historical consumer events associated with a given user. In this case, the historical consumer events are raw trades or tradelines that are extracted by Data Processor 150 from a historical record such as a user's trade history or credit report. The processed data is received at 105 by Sequence Analyzer 1120, which is included in Connectivity Analyzer 160.

In particular, Sequence Analyzer 1120 receives raw consumer event data (e.g., a list or series of raw trades or tradelines) associated with the given user and transforms the raw consumer event data associated with the given user into a sequence of given user categorical variables at different granularities. Next, Sequence Analyzer 1120 obtains a sequence of user candidate categorical variables at different granularities from Event Sequence Database 1125. Sequence Analyzer 1120 compares the sequence of given user categorical variables at different granularities to the sequence of user candidate categorical variables at different granularities. In some embodiments, Sequence Analyzer 1120 applies a sequence alignment algorithm to compare the sequence of given user categorical variables at different granularities to the sequence of user candidate categorical variables at different granularities.

Finally, Sequence Analyzer 1120 generates an event sequence similarity score in response to the comparison of the sequence of given user categorical variables at different granularities to the sequence of user candidate categorical variables at different granularities. In some embodiments, the comparison is a result generated by applying a sequence alignment algorithm to the sequence of given user categorical variables at different granularities and the sequence of user candidate categorical variables at different granularities. In addition, in some cases machine learning techniques are applied to generate or determine the synthetic identity score, for example, by using derived indicators or other extracted or derived signals or features obtained from analyzing the processed data. In the particular case of applying a sequence alignment algorithm, the derived indicators include the result generated by the sequence alignment algorithm as applied to the sequence of given user categorical variables at different granularities and the sequence of user candidate categorical variables at different granularities. Generated in this manner, the event sequence similarity score captures or is indicative of a similarity between a sequence of given user historical consumer events associated with the given user and a sequence of user candidate historical consumer events associated with the given soft-linked user candidate.

Sequence Analyzer 1120 obtains the sequence of user candidate historical consumer events associated with a soft-linked user candidate by accessing or querying Event Sequence Database 1125 in order to perform an analysis or comparison of the soft-linked user candidate sequence of events to the sequence of given user historical consumer events associated with the given user. Event Sequence Database 1125 is configured to contain or house sequences of user historical consumer events associated with users whose data has been previously processed by Data Processor 150 and analyzed by Sequence Analyzer 1120. In the example shown, Sequence Analyzer 1120 also stores the sequence of given user categorical variables at different granularities in Event Sequence Database 1125, which provides an ability to access the sequence of given user categorical variables at different granularities in response to another or subsequent user request or user application received by the disclosed system.

Figure 12:
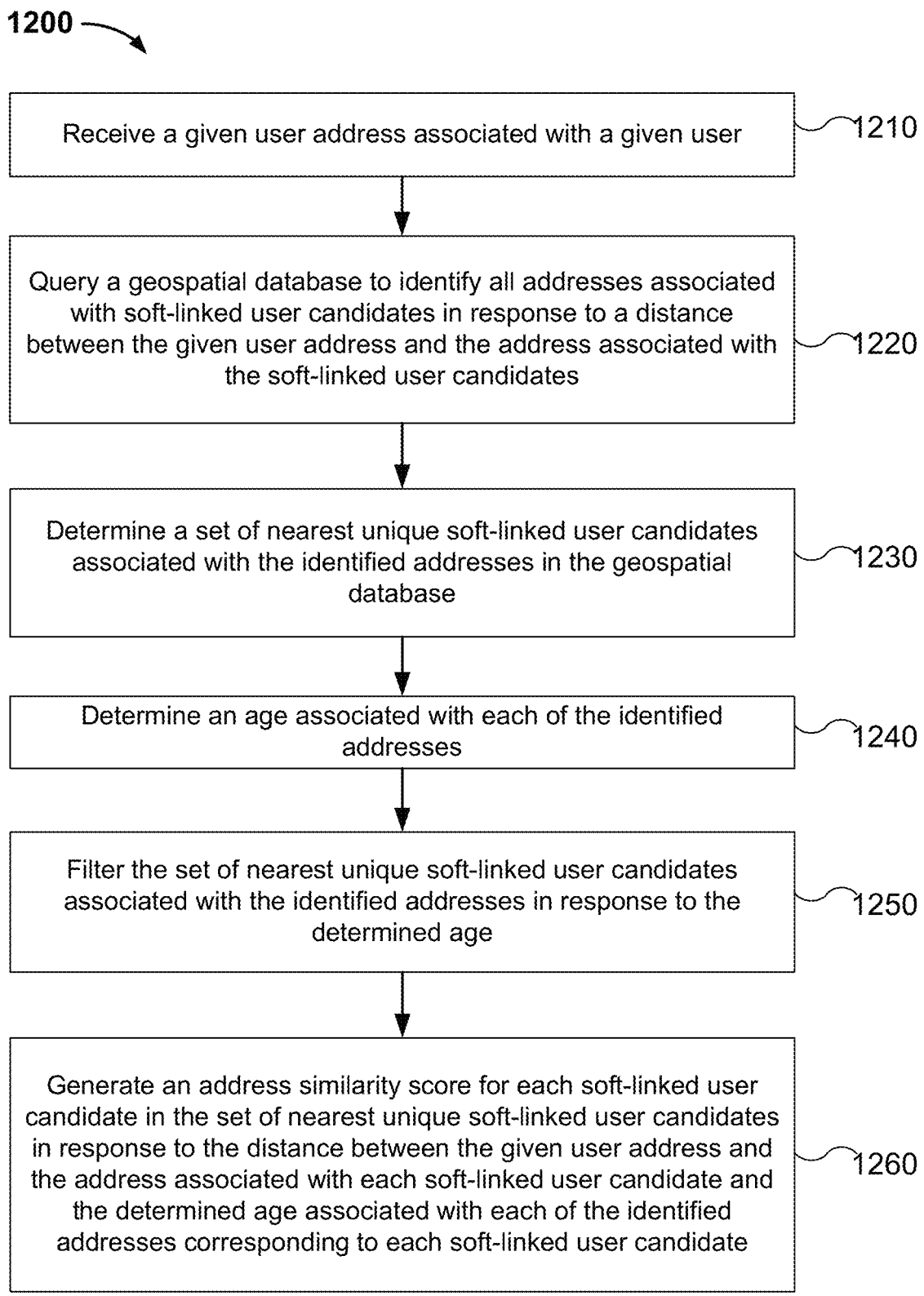
FIG. 12 is a flowchart illustrating an exemplary method of generating a similarity score in response to an address for use in soft-linking users in a layered network graph according to the system and method disclosed herein.
Figure 13:
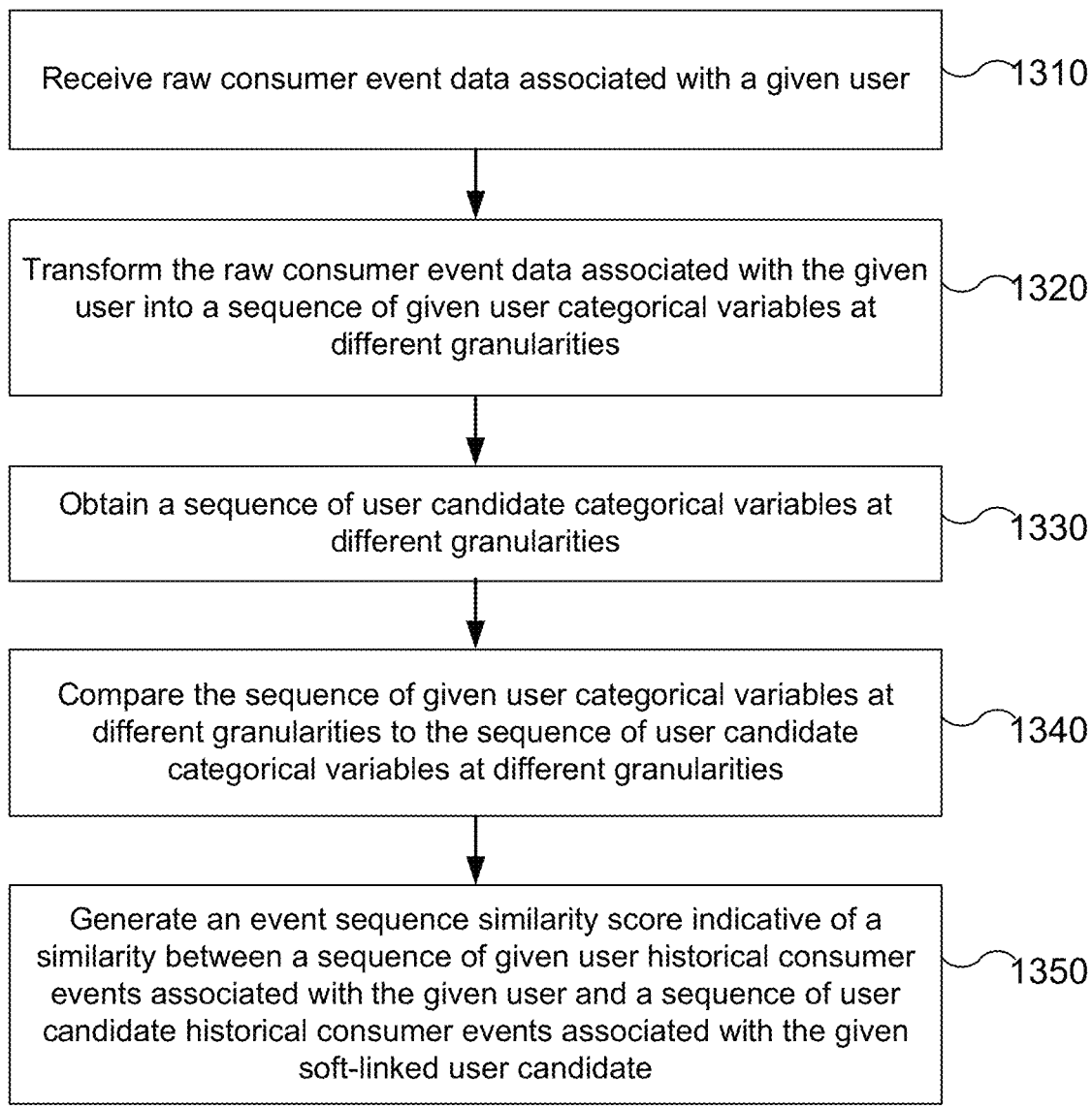
FIG. 13 is a flowchart illustrating an exemplary method of generating an event sequence similarity score in response to a sequence of given user historical consumer events associated with the given user for use in soft-linking users in a layered network graph according to the system and method disclosed herein.

FIGS. 12 and 13 are flowcharts depicting an exemplary method of generating a similarity score in response to each of a plurality of given soft user attributes for use in soft-linking users in a layered network graph according to the system and method disclosed herein. In particular, FIGS. 12 and 13 depict methods applicable where the plurality of given soft user attributes includes an address and a sequence of historical user events.

FIG. 12 is a flowchart illustrating an exemplary method of generating a similarity score in response to an address for use in soft-linking users in a layered network graph according to the system and method disclosed herein. Note that the method 1200 of FIG. 12 can be performed by Address Analyzer 1110 in combination with Geospatial Database 1115 as described with respect to FIG. 11.

As shown in FIG. 12, the method 1200 is initiated by receiving a given user address associated with a given user at 1210. At 1220, a geospatial database is queried to identify all addresses associated with soft-linked user candidates in response to a distance between the given user address and the address associated with the soft-linked user candidates. In some embodiments, the method includes generating a geospatial database from information associated with user addresses extracted from user data as will be described in more detail below.

At 1230, a set of nearest unique soft-linked user candidates associated with the identified addresses in the geospatial database is determined. At 1240, an age associated with each of the identified addresses is determined. A deduping process can be employed to the identified addresses and their associated soft-linked user candidates in order to determine the set of nearest unique soft-linked user candidates associated with the identified addresses. The set of nearest unique soft-linked user candidates associated with the identified addresses is filtered at 1250 in response to the determined age associated with each of the identified addresses.

Finally, at 1260, an address similarity score is generated for each soft-linked user candidate in the set of nearest unique soft-linked user candidates. In the example shown, the address similarity score is generated in response to the distance between the given user address and the address associated with each soft-linked user candidate and the determined age associated with each of the identified addresses corresponding to each soft-linked user candidate.

In some embodiments the given user address associated with a given user comprises a plurality of addresses. For example, a given user often has several addresses with which the given user is associated including a billing address and an alternate address (extracted for example from a credit application), a former address (e.g., historical addresses extracted from a credit report), and any employer's addresses. The system of FIG. 11 and method of FIG. 12 are applicable to a plurality of addresses associated with a given user, the steps of FIG. 12 being applied to a plurality of given user addresses.

More specifically, in the case where the given user address comprises a plurality of addresses associated with the given user, the method 1200 is initiated by receiving the plurality of addresses associated with the given user at 1210. A geospatial database is queried at 1220 to identify all addresses associated with soft-linked user candidates in response to a distance between each given user address in the plurality of addresses associated with the given user and the address associated with the soft-linked user candidates.

At 1230, a set of nearest unique soft-linked user candidates associated with the identified addresses in the geospatial database is determined. At 1240, an age associated with each of the identified addresses is determined. A deduping process can be employed to the identified addresses and their associated soft-linked user candidates in order to determine the set of nearest unique soft-linked user candidates associated with the identified addresses. The set of nearest unique soft-linked user candidates associated with the identified addresses is filtered at 1250 in response to the determined age associated with each of the identified addresses. Finally, at 1260, an address similarity score is generated for each soft-linked user candidate in the set of nearest unique soft-linked user candidates.

The system of FIG. 11 and method of FIG. 12 illustrate a technique for capturing similarities between two addresses in two different dimensions—namely, space and time. This approach highlights the importance of considering proximity to the address of the given user in both space and time to account for the tendency of a synthetic identity fraudster or a synthetic identity fraudster ring to conduct activities using multiple (e.g., on the order of hundreds if not thousands) synthetic identities that are active in the same region at the same time. In particular, in order to manage multiple synthetic identities, a synthetic identity fraudster or a synthetic identity fraudster ring will operate within a certain geographical area or region and within a limited time period for practical reasons. This tendency is evidenced in identities established using addresses that are close in proximity both in space (e.g., geospatial proximity within a two-mile radius of the given user address) and time (e.g., temporal proximity within six months of the given user's request or application).

To capture this tendency, the address similarity score can be generated to increase as the determined distance between the address associated with the given user and the address associated with the given soft-linked user candidate decreases. Here, a higher similarity score represents a closer proximity of the location of the address associated with the given soft-linked user candidate and the location of the address associated with a given user. Note that this method is based only on a distance between two locations as determined by two addresses and is independent of the actual geographical location of each address. As another example, the address similarity score is generated to increase as the age of the address associated with the given soft-linked user candidate decreases. This approach assigns a greater weight to more recent addresses of the soft-linked user candidates, favoring recent addresses over older addresses used by the soft-linked user candidates in their own user requests or credit applications, the premise being that user applications made more closely together in time and from nearby locations with respect to one another are more similar and have a higher likelihood of being synthetic identities.

FIG. 13 is a flowchart illustrating an exemplary method of generating an event sequence similarity score in response to a sequence of given user historical consumer events associated with the given user for use in soft-linking users in a layered network graph according to the system and method disclosed herein. Note that the method 1300 of FIG. 13 can be performed by Sequence Analyzer 1120 in combination with Event Sequence Database 1125 as described with respect to FIG. 11.

As shown in FIG. 13, the method 1300 is initiated by receiving raw consumer event data (e.g., a list or series of raw trades or tradelines) associated with a given user at 1310 and transforming the raw consumer event data associated with the given user into a sequence of given user categorical variables at different granularities at 1320. Next, a sequence of user candidate categorical variables at different granularities is obtained at 1330. In particular, the sequence of user candidate categorical variables at different granularities is obtained by transforming raw consumer event data associated with the soft-linked user candidate.

In some embodiments, the sequence of user candidate categorical variables has been previously generated and stored in a database. In the example of FIG. 11, Event Sequence Database 1125 stores previously processed and transformed raw consumer event data associated with users who have made user requests in the past. Here, Event Sequence Database 1125 contains sequences of historical consumer events associated with users whose data has been previously processed by Data Processor 150 and analyzed by Sequence Analyzer 1120. Although not shown in FIG. 13, in some embodiments, method 1300 includes storing the sequence of given user categorical variables at different granularities in an event sequence database (e.g., Event Sequence Database 1125). This provides an ability to access the sequence of given user categorical variables at different granularities in response to another or a subsequent user request or user application received by the disclosed system.

Returning to FIG. 13, the sequence of given user categorical variables at different granularities is compared to the sequence of user candidate categorical variables at different granularities at 1340. In some embodiments, a sequence alignment algorithm is applied to compare the sequence of given user categorical variables at different granularities to the sequence of user candidate categorical variables at different granularities.

Finally, at 1350, an event sequence similarity score is generated in response to the comparison of the sequence of given user categorical variables at different granularities to the sequence of user candidate categorical variables at different granularities. In some embodiments, the comparison is a result generated by applying a sequence alignment algorithm to the sequence of given user categorical variables at different granularities and the sequence of user candidate categorical variables at different granularities. In addition, in some cases, machine learning techniques are applied to generate or determine the synthetic identity score, for example, by using derived indicators or other extracted or derived signals or features obtained from analyzing the processed data. In the particular case of applying a sequence alignment algorithm, the derived indicators include the result generated by the sequence alignment algorithm as applied to the sequence of given user categorical variables at different granularities and the sequence of user candidate categorical variables at different granularities. The event sequence similarity score generated in this manner captures or is indicative of a similarity between a sequence of given user historical consumer events associated with the given user and a sequence of user candidate historical consumer events associated with the given soft-linked user candidate.

In some embodiments and in particular, as applied to the credit application example, the disclosed system and method include generating an event sequence database from raw consumer event data. This data includes information associated with raw trades or tradelines extracted from consumer data.

For example, consumer events such as raw trades or tradelines are extracted from a historical record such as a user's trade history or credit report. These raw trades are transformed into categorical variables that are at different levels of granularity, the most granular version having many categories and the least granular version having fewer categories. At a fine level of granularity, a raw trade is transformed into a categorical variable that includes several attributes or categories such as, for example, the actual full subscriber name, the type of trade (e.g., installment loan, credit card loan, automobile loan) as well as an amount range of the loan size, and whether the trading account is held jointly or individually. At a course level of granularity, the raw trade is transformed into a categorical variable that includes fewer attributes or categories such as, for example in the case of a credit card where the account is held individually with no associated amount or subscriber name (i.e., attribute data that is missing or unavailable). As noted above, this transformation process is performed for the given user (the applicant at hand) and has also been performed historically and stored in an event sequence database for all previous applicants.

Sequences of historical consumer events associated with consumers are thus represented by sequences of categorical variables in time generated by transforming raw consumer event data associated with a particular consumer. In particular, the process of transforming raw consumer event data into sequences of categorical variables in time can be performed for any user that makes a user request according to the disclosed system and method. The sequences of categorical variables can be stored in an event sequence database containing sequences of historical consumer events for all previous applicants who have made such requests and for access by the disclosed system when needed.

Recall that a goal of soft-linking users is to form layers or clusters of unique soft-linked users that are most similar to the given user as determined by their generated similarity scores. Here, the soft user attribute is a sequence of categorical variables derived from a history of trades associated with a given user. The sequence of categorical variables is a representation of the given user's trade history and reflects the given user's historical trade behavior or pattern of trade use. The goal is to determine other applicants who are most similar to the given user based on similarities in their respective trade histories, which are captured in the sequences of categorical variables stored for each applicant in the event sequence database. To determine how similar the sequences in the event sequence database are to the sequence associated with the given user, a similarity metric is applied. In this case, the similarity metric is provided by applying a sequence alignment algorithm to compare the sequence of categorical variables associated with the given user to each of the sequences of categorical variables associated with previous applicants in the event sequence database. The comparison result obtained by applying the sequence alignment algorithm is used to generate a similarity score for each of the applicant candidates having a sequence of categorical variables stored in the event sequence database. The similarity score represents how similar each applicant candidate is to the given user based on a comparison of their trade histories as represented by their respective sequences of categorical variables. Finally, a criteria is used to determine the set of applicants to be soft-linked to the given user. The soft-linked applicants form a layer in the layered graph network as described herein and can be used by the disclosed system and method to generate a synthetic identity score for the given user.

As an example, suppose a new user request is received for a given user and a sequence of categorical variables is generated in response to extracting features from and analyzing raw trade data associated with the given user. The disclosed system queries an event sequence database to identify the 100 previous applicants who have had similar trade sequences to the given applicant based on sequences of categorical variables that have been previously extracted from each previous applicant's trade history (e.g., a credit report). The 100 most similar previous applicants are determined based on applying a similarity metric to compare each applicant's sequence to the given user's sequence to determine a similarity score. In this case, the metric is provided by applying a sequence alignment algorithm to determine how closely the sequence of categorical variables for the given user (which reflects the given user's trade history) matches each sequence of categorical variables for each of the previous applicants (which reflects each of the previous applicants' trade histories). In particular, the sequence alignment algorithm can use substitution, addition, transposition, or swapping to compute a Hamming distance between two sequences. In response to the result provided by applying the sequence alignment algorithm, an event sequence similarity score is determined for each applicant candidate having a sequence of categorical variables in the event sequence database. At this point, the applicants having the highest 100 similarity scores are selected to be soft-linked to the given user.

Alternatively, a filter or model can be applied to account for other features or attributes that characterize an applicant's trade behavior but are not captured in the sequence of categorical variables. For example, different ways to capture or characterize the aspect of time between events in a sequence, the total duration of a sequence of events, and the difference in when the given user's historical sequence of events took place as compared with a sequence of events associated with an applicant candidate can be implemented. In some embodiments, the time between trades or events is ignored, while in other embodiments a gap variable is used to denote the time between trades. As in the case of providing greater weight to an age of identified addresses that are more recent versus those that are older, a weight can also be assigned to an age of a sequence of categorical events (as determined by when the events occurred) associated with a given user as compared with the age of a sequence of categorical events associated with an applicant candidate. The weight can be non-uniform, such as an exponential decay applied to time as a difference in age between the given user's sequence and the applicant candidate's sequence increases, in order to provide a greater weight to trade histories that occurred closer together in time.

Although the examples above and some of the embodiments described herein are applied to two particular soft user attributes, namely, an address and a sequence of historical user events, the disclosed technique is not limited to these two soft user attributes. In particular, the disclosed technique can be applied to various different soft user attributes or attributes that do not lend themselves to exact matching between users. In other words, different types of processed data may be extracted from different types of user data, which may in turn drive different types of analyses that lead to the use of different types of similarity metrics to generate different types of similarity scores. Additional components or analyzers may be added or removed as needed from Connectivity Analyzer 160 and other analyses may be performed by these components or analyzers without changing the scope of the disclosed system and method. Indeed, the disclosed approach is configured to be flexible in accommodating different types of data from different sources and different types of analysis that may not be currently available but that may become available in the future.

Returning for a moment to FIGS. 3A and 3B, the process at 310 of generating a layered graph network of linked users in response to user data associated with a given user has been described with some detail above. The next step at 320 of deriving collective connectivity indicators from the layered graph network will now be described below.

In some embodiments, indicators or signals are derived from the layered graph network described herein based on or in response to attributes of the linked users who are connected by links in the layered graph network. Attributes of the linked users include user features such as a user's credit score, income, total outstanding debt, oldest trade, and whether the user owns or rents a residence. Certain attributes are extracted from user data such as a user's credit report and can additionally include a user's name, date of birth, social security number (SSN), various addresses associated with the user or the user's employer, employer information, and fraud products (e.g., indicators that a user's SSN has been stolen in the past). Attributes can also include soft attributes such as a user's trade history represented by a sequence of categorical variables transformed from a sequence of historical user events.

Taking the credit application example, user data extracted and processed from a user's credit report can be used to derive indicators or signals, which can then be used as inputs into a machine learning model or engine to generate a synthetic identity score. Note that certain types of user data such as, for example, features or attributes extracted from an individual's credit report, are accessible without connecting or linking users together in a layered graph network. What the layered graph network does provide, however, is key information and critical guidance as to which users are similar, related, connected, or linked to a given user. Once the cluster of similar, related, connected, or linked users is identified, features or attributes can be extracted from the linked user's individual credit reports and other sources of individual data.

Examples of features or attributes that are extracted from a user's credit report are listed in Table 2 below:

TABLE 2

| Examples of Features or Attributes |
| --- |
| Average time between tradelines |
| Fastest time between tradelines |
| Transition time between authorized user and individual secured account |
| Transition time between secured and unsecured |
| Inquiries in the past 7/30/180 days |
| Time delta between oldest trade and SSN issuance year |
| Time delta between oldest authorized user trade as authorized user and SSN issuance year |
| Time delta between oldest trade and year of birth |
| Time delta between year of birth and SSN issuance year |
| Distance between SSN issuance state and closest address |
| Length of oldest trade |
| Length of oldest individual credit card trade |
| Length of oldest individual trade |
| Total revolving credit limit |
| Total balance outstanding |
| Total revolving balance |
| Total unsecured balance |
| Total authorized user revolving credit limit |
| Total authorized user balance outstanding |
| Total authorized user revolving balance |
| Total authorized user unsecured balance |
| Number of total/open/closed trades |
| Number of individual/joint/authorized user trades |
| Largest authorized user limit/amount |
| Total number of secured accounts |
| Total balance on secured accounts |
| Total limit/amount on secured accounts |
| Number of 30/60/90 day derogatory delinquencies |
| Maximum number of trades opened within 1/3/6 months |
| Total number of mortgage/HELOC accounts |
| Total number of auto accounts |
| Number of public records |

As shown in Table 2, a user's credit report can provide features such as an average time between tradelines (e.g., an average time between applying for different lines of credit), a fastest time between tradelines (e.g., a fastest time between applying for different lines of credit), a transition time between the user becoming an authorized user to a secured user, a transition time between the user being a secured user to an unsecured user, a number of inquiries in the past 7/30/180 days, a time difference between the oldest trade on the credit report and the user's social security number (SSN) issuance year, a time difference between the oldest trade on the credit report and the user's birth year, a time difference between the user's birth year and the user's SSN issuance year, and a distance between the SSN issuance state and the closest user address. These and other features can be used as attributes for clustering or linking similar users.

In particular, based on or in response to identified groups of similar users, for example as determined by clusters or layers in the layered graph network, features can be analyzed or examined across the clusters or layers of users at various levels of granularity (e.g., looking only at users having a particular degree of separation from a given user or alternatively, looking at all linked users across the entire layered graph network). In the case where a feature or attribute is analyzed across groups of linked users, certain statistical properties or metrics can be extracted as signals or indicators. For example, taking FICO scores, total amounts of credit, or thickness or length of credit reports across all users who are linked to a given user at various granularities, certain statistics or statistical properties or metrics can be determined and used as signals or indicators. For instance, an average or median value of FICO scores of linked users can be taken, or percentiles can be used to obtain a better measure of a tendency in a group of users and to minimize the impact of outliers in the group.

As an example of using a percentile as applied to attributes of a group of linked users, suppose there are ten users linked to a given user (forming a cluster of ten users) and the 80th percentile credit report history length or trade length for the cluster is two years. In this case, eight out of the ten users have relatively short credit histories (i.e., two years). Taken together with the fact that the users are clustered together, this means that they share certain characteristics and are all new to credit. Accordingly, this particular fact pattern indicates a higher likelihood that the cluster of users is actually synthetic identities being maintained by one bad actor or entity. But suppose on the other hand that the 20th percentile thickness of the user credit history or credit file in the cluster is twenty trades. In this case, one could conclude that most of the users in the cluster have a thick credit history (i.e., eight out of the ten users have a thick file of at least twenty trades), which suggests a lower likelihood that the users are synthetic identities. Thus, using percentiles mitigates the impact of unduly attributing too much weight to outliers in the cluster of users. This approach minimizes the effect of linkages to users that are false positives, for instance, where the detected similarities are the result of coincidence rather than indicative of an actual relationship between the users, leading to more accurate predictions of a synthetic identity score.

Statistics or statistical properties or metrics employed by the system and method disclosed herein can also include counts or cardinalities such as the number of soft-linked users or connections and hard-linked users or connections to a given user, the number of linked users created within a certain timeframe such as within the last one month, two months, three months, four months, five months, or six months. Each user's similarity score can also be considered as a feature. For example, ten soft-linked users directly linked to a given user where each has a score of roughly 0.5 on a 1.0 scale may be considered equivalent to six soft-linked users directly linked to a given user where each has a score of roughly 0.8 on a 1.0 scale.

Returning again to FIGS. 3A and 3B, the processes of generating a layered graph network of linked users at 310 and of deriving collective connectivity indicators from the layered graph network at 320 have been described above. The next steps of reconstructing a user score progression in response to a user history of the given user at 330 and of deriving individual identity indicators from the reconstructed user score progression at 340 will now be described below.

The disclosed system and method derive collective connectivity indicators from the layered graph network, reconstruct a user score progression in response to a user history of the given user, and derive individual identity indicators from the reconstructed user score progression. While the collective connectivity indicators are configured to capture patterns manifested in the group of similar applicants to a given user, the reconstructed user score progression is configured to capture patterns in a given user's individual behavior.

The impetus for reconstructing a user score progression in this case arises from the need for synthetic identity fraudsters to establish a good historical record of user events (e.g., a good credit history) in a relatively short period of time. This need is evidenced in an accelerated progression of events characteristic of a synthetic identity that is typically not present in the case of a legitimate identity manifested in a pattern that can be extracted from a given user's individual history. In the credit application example, based on or in response to a history of credit events such as tradelines extracted from a given user's credit report, the system (e.g., Identity Analyzer 170 of FIG. 1) reconstructs a credit score progression for a given user and derives individual identity indicators based on or in response to the reconstructed credit score progression.

Individual identities that are synthetic look different and behave differently as compared with real identities. Accordingly, the system performs identity level checks using identity level signals or indicators extracted from user data.

One example of extracting identity level signals or indicators in order to perform identity level checks includes reconstructing a user score progression. Here, the reconstruction serves to playback or simulate a user's behavior with respect to the events building up to establishing a good history or historical record, and in particular, how quickly the user establishes a good history or historical record. In the credit application example, synthetic identity fraudsters are trying to establish credit for their synthetic identities as quickly as possible—typically within a one to three year incubation period. To capture the speed at which a particular user is acquiring credit, the system determines a credit score for the user based on rolling back the user's credit history as provided by the user's credit report.

In particular, to determine a credit score at a previous moment in time, the system removes the most recent trades back to the previous moment in time and determines a credit score based only on the trades leading up to and including the previous moment in time. This process is repeated for various time increments going back in time to generate a plurality of credit scores, each corresponding to a previous moment in time. The plurality of credit scores forms a time-ordered set of credit scores representing a reconstruction of a user's credit score progression over time. The system then derives individual identity indicators from the reconstructed credit score progression, which can be used as inputs to a machine learning model for generating a synthetic identity score for the user.

Figure 14:
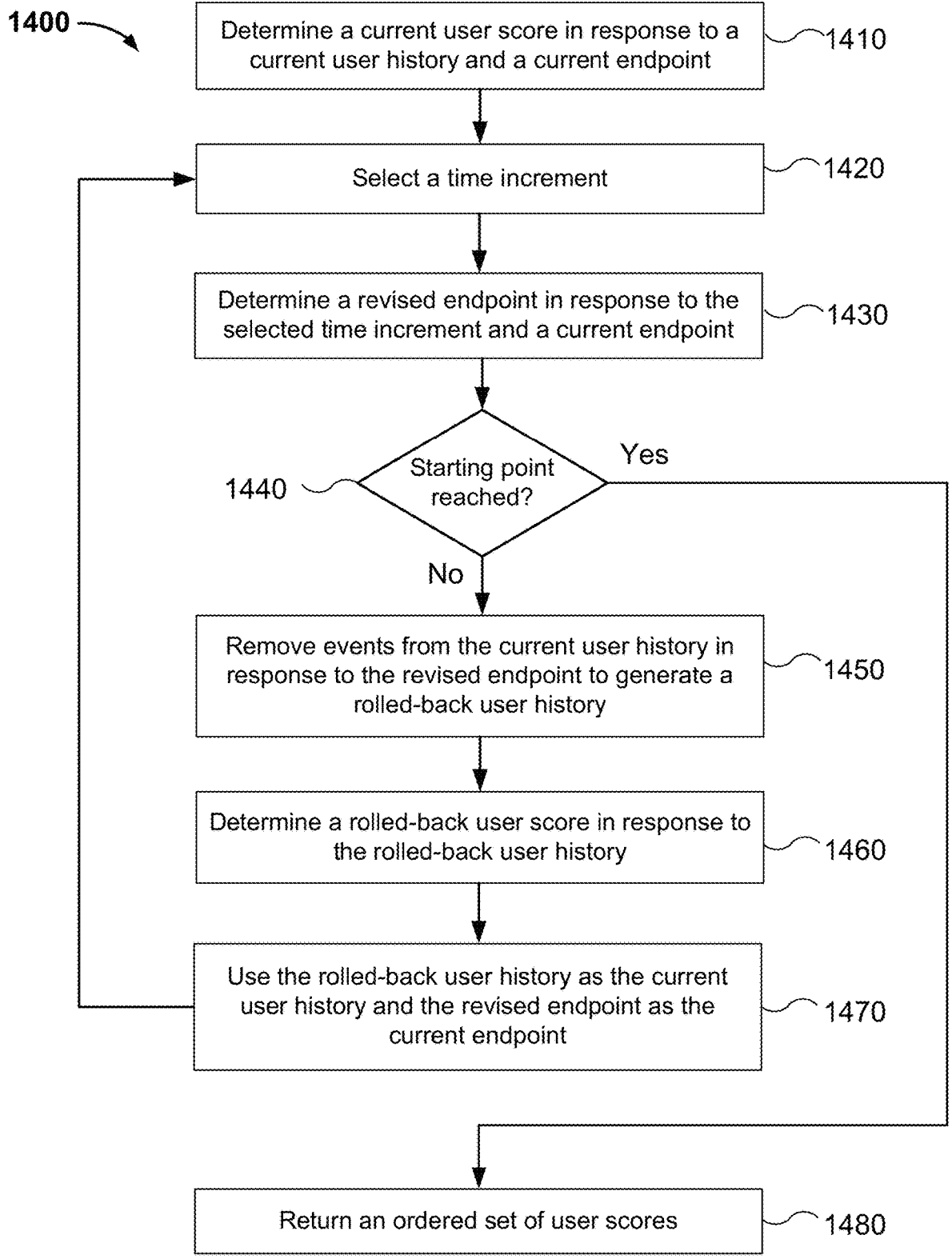
FIG. 14 is a flowchart illustrating an exemplary method 1400 of reconstructing a user score progression in response to a user history of the given user performed by the system as described herein.

FIG. 14 is a flowchart illustrating an exemplary method 1400 of reconstructing a user score progression in response to a user history of the given user performed by the system as described herein. First, at 1410, the system determines a current user score based on or in response to a current user history and a current endpoint. In the example shown, the current user history includes a sequence of events associated with the user. The current endpoint can be selected as the date corresponding to or associated with running or obtaining the current user history. Alternatively, the current endpoint can be selected to coincide with a date of a most recent event recorded in the current user history or a date of a final event in the current user history. Taking the credit application example, if the current user history is a credit report, the credit report includes a sequence of trades or tradelines associated with the user acquiring or establishing credit. In this case, the system determines a current credit score based on or in response to the trades or tradelines in the user's current credit report up to the current endpoint (e.g., the date the credit report is obtained from the credit bureau).

Next, at 1420, the system selects a time increment. At 1430, the system determines a revised endpoint based on or in response to the selected time increment and the current endpoint. In the example shown, the revised endpoint is determined based on subtracting the selected time increment from the current endpoint.

At 1440, the system determines whether the starting point of the current user history has been reached. This determination can be based on a date or time associated with a starting point marking the beginning of the user history. For example, the starting point can represent the date or time of a first event in the user's history such as the date or time when the user first applied for credit. If the revised endpoint is determined to coincide with or to precede the starting point, the system determines that the starting point has been reached. If on the other hand, the system determines that the revised endpoint occurs after the starting point, the system determines that the starting point has not yet been reached.

If the system determines that the starting point has not yet been reached (e.g., that there are events that precede the revised endpoint), at 1450, the system removes events from the current user history in response to the revised endpoint to generate a rolled-back user history.

At 1460, the system determines a rolled-back user score based on or in response to the rolled-back user history. The rolled-back user score can be stored or saved for later use.

At 1470, the system uses, replaces, or substitutes the rolled-back user history for the current user history and uses, replaces, or substitutes the revised endpoint in place of the current endpoint. The system repeats steps 1420, 1430, 1440, 1450, 1460, and 1470 of the process until the starting point is reached. Once the starting point is reached, the method returns an ordered set of user scores at 1480.

In the manner as described above and as depicted in FIG. 14, the system generates a series of rolled-back user scores corresponding to previous time periods based on a selected time increment to provide a set of reconstructed user scores. Note that the selected time increment can be varied to be set to different periods of time. Alternatively, the selected time increment can be varied based on determining or setting a number of events to include or exclude from the determination of the rolled-back user score.

Additionally, the reconstructed user scores can be ordered in a chronological sequence representing a reconstruction of a user score progression based on rolling back the user history in increments according to the method 1400.

Figure 15A:
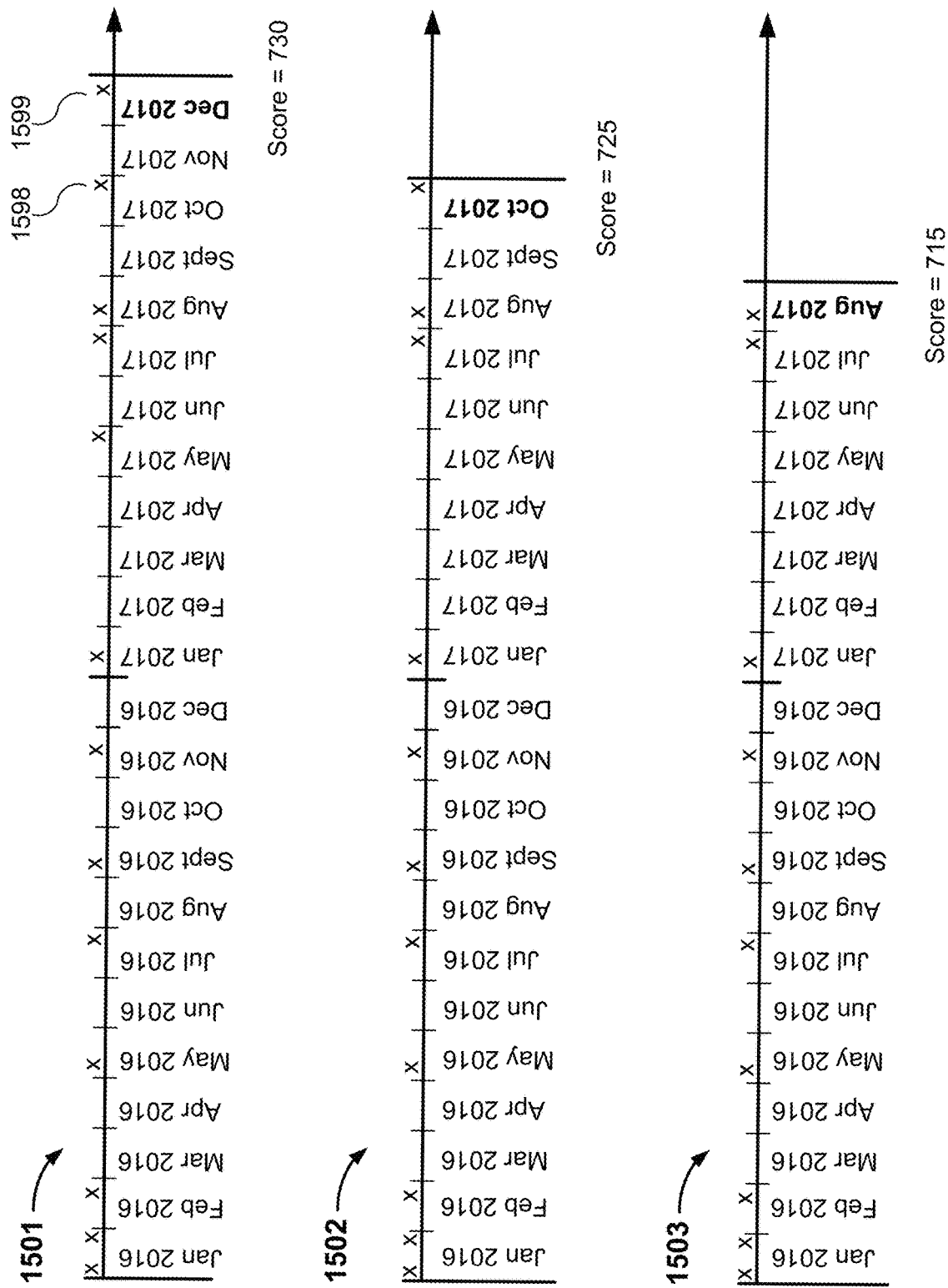
FIG. 15A depicts an example of a user's credit history as used for reconstructing a user score progression according to the method depicted in FIG. 14.

FIG. 15A depicts an example of a user's credit history as used for reconstructing a user score progression according to the method 1400 of FIG. 14. Returning to the credit application example as applied with respect to the method 1400 of FIG. 14, suppose at 1410 that the system determines a current credit score of 730 based on a current credit report for John Doe pulled from or generated by a credit bureau on Dec. 30, 2017. A timeline of events 1501 extracted from John Doe's current credit report is shown in FIG. 15A. An event in this case is shown or marked on the timeline as an "X." Each event represents an instance where John Doe applied for credit or applied to open a new tradeline. The events are plotted on the timeline having a scale where each increment or section is one month. The timeline of events 1501 starts on Jan. 1, 2016, which is the date John Doe first applied for credit, and runs for a period of twenty four months, ending on Dec. 30, 2017.

Returning to FIG. 14, a time increment of two months is selected at 1420 and a revised endpoint is determined at 1430 by subtracting two months from the current endpoint of Dec. 30, 2017, resulting in a revised endpoint of Oct. 30, 2017. The system determines that John Doe's current credit report has a starting point of Jan. 1, 2016. At 1440, the system determines that the revised endpoint of Oct. 30, 2017 occurs after the starting point of Jan. 1, 2016 resulting in a determination that the starting point has not yet been reached. The system then proceeds to step 1450.

At 1450, the system removes the trades, tradelines, and other events in John Doe's current credit report occurring after the revised endpoint of Oct. 30, 2017 to generate a rolled-back credit report, representing John Doe's credit history from the starting point of Jan. 1, 2016 up to and including Oct. 30, 2017. Thus, the rolled-back credit report now contains only the trades, tradelines, and other events associated with John Doe's credit history up to and including Oct. 30, 2017. This rolled-back credit report, which runs up to and including Oct. 30, 2017, is shown as a second timeline 1502 in FIG. 15A.

At 1460, the system determines a rolled-back user score in response to the rolled-back user history shown as timeline 1502 in FIG. 15A, which in this case is John Doe's credit history up to and including the revised endpoint of Oct. 30, 2017. Note that the rolled-back user score associated with the revised endpoint of Oct. 30, 2017 excludes the last event at 1599, which occurred in December of 2017. The system determines a rolled-back user score of 725 based on the rolled-back user history up to and including Oct. 30, 2017. The rolled-back user score of 725 is stored or saved by the system for later use.

At 1470, the system uses the rolled-back user history, which in this case is John Doe's credit history up to and including the revised endpoint of Oct. 30, 2017 (shown as timeline 1502 in FIG. 15A) as the current history. The system also uses the revised endpoint of Oct. 30, 2017 as the current endpoint and repeats steps 1420, 1430, 1440, 1450, 1460, and 1470. Specifically, at 1420, a time increment is selected, which can have the same or a different value as a previously selected time increment. In this example, the system selects a time increment of two months at 1420 and at step 1430, determines a revised endpoint of Aug. 30, 2017 by subtracting the selected time increment of two months from the current endpoint, which is now Oct. 30, 2017. At 1440, the system determines that the revised endpoint of Aug. 30, 2017 occurs after the starting point of Jan. 1, 2016 resulting in a determination that the starting point has not yet been reached. The system then proceeds to step 1450, where it removes the trades, tradelines, and other events in John Doe's current credit report occurring after the revised endpoint of Aug. 30, 2017 to generate a rolled-back credit report, representing John Doe's credit history from the starting point of Jan. 1, 2016 up to and including Aug. 30, 2017. This rolled-back credit report, which runs up to and including Aug. 30, 2017, is shown as a third timeline 1503 in FIG. 15A.

At 1460, the system determines a rolled-back user score in response to the rolled-back user history, which in this case is John Doe's credit history up to and including the revised endpoint of Aug. 30, 2017 (shown as timeline 1503 in FIG. 15A). Note that the rolled-back user score associated with the revised endpoint of Aug. 30, 2017 excludes the last two events at 1599 and 1598, which occurred in December and October of 2017 respectively. The system determines a rolled-back user score of 715 based on the rolled-back user history up to and including Aug. 30, 2017. The rolled-back user score of 715 associated with the revised endpoint of Aug. 30, 2017 is stored or saved by the system for later use.

At 1470, the system uses the rolled-back user history, which in this case is John Doe's credit history up to and including the revised endpoint of Aug. 30, 2017 (shown as timeline 1503 in FIG. 15A) as the current history. The system also uses the revised endpoint of Aug. 30, 2017 as the current endpoint and repeats steps 1420, 1430, 1440, 1450, 1460, and 1470 until the starting point of Jan. 1, 2016 is reached.

Figure 15B:
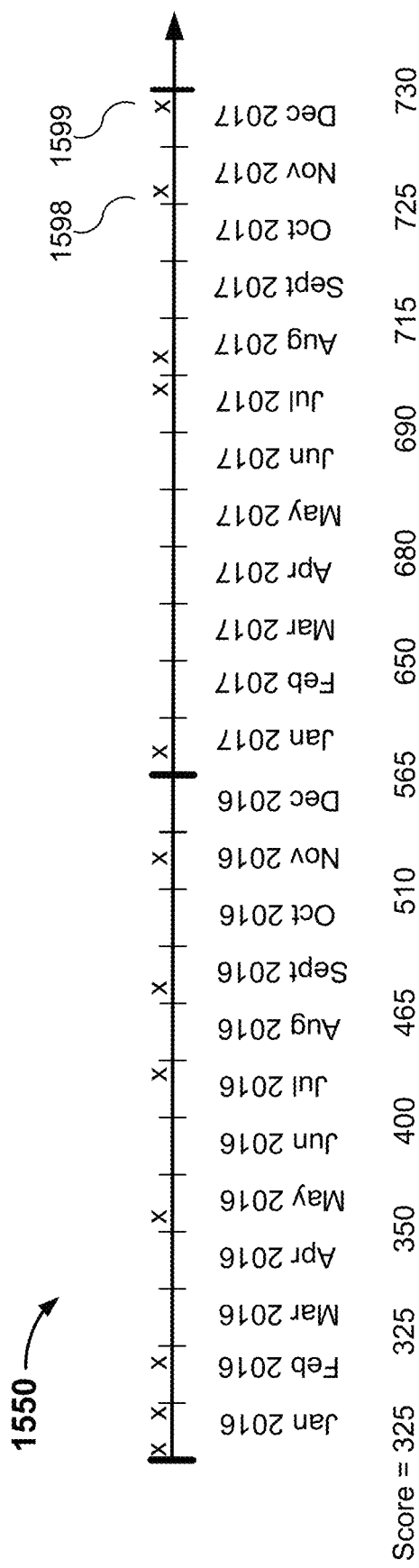
FIG. 15B depicts a reconstructed credit score progression for the example described with respect to FIGS. 14 and 15A.

FIG. 15B depicts a reconstructed credit score progression 1550 for the example described with respect to FIGS. 14 and 15A. In particular, once the system has reached the starting point, the system returns an ordered set of user scores corresponding to previous time periods based on a selected time increment to provide a set of reconstructed user scores. In the credit application example described above, the system returns a set of credit scores for John Doe determined over the course of about twenty-four months (i.e., from the starting point of Jan. 1, 2016 to the endpoint of Dec. 30, 2017), where the credit scores have been determined in increments of two months. This sequence of credit scores ordered chronologically in time reconstructs a credit score progression for John Doe from which a signal or indicator is extracted representing the speed at which John Doe has raised his credit score over the course of about two years. This sequence of credit scores ordered chronologically in time for the example of John Doe described above is depicted in FIG. 15B.

Signals or indicators can be derived from the reconstructed credit score progression by, for example, taking differences between credit scores at different endpoints to determine how quickly the user is increasing his or her credit score. A difference can be determined based on the user's credit score today minus the user's credit score two years ago, or by taking a set of differences based on the user's credit score today minus the user's score three, six, or nine months ago. The system can analyze the difference or set of differences between different endpoints in the user's history and determine how quickly a user is building up the user's score over a certain period of time. In particular, periods of intense growth as exhibited by large differences between a user's credit score over a relatively small amount of time are more likely to indicate that the user is a synthetic identity.

As described above, the system reconstructs a user score progression in response to user data associated with a given user to get a sense of how the given user has been acquiring credit by effectively replaying the given user's history. In some embodiments, a simplified formula for determining a user score is used due to data that may not be available as the user's history is effectively rolled back in time. In the credit application example, some features of a credit report are only available at the time the credit report is obtained but are not available historically. For instance, a current credit report includes features such as a current credit card balance, but does not include historical balances or historical limits. Additionally, credit reports include strings of payments (e.g., information that previous payments were made on time) but does not include any of the balance or payment amounts.

Note also that while this is one example of a type of data from which individual identity indicators may be derived, the technique is not limited to the use of reconstructed score progressions. Other types and sources of data and signals that capture or relate to the given user's individual characteristics, patterns of use, or behavior can be used to derive individual identity indicators without limiting the scope of the system and method disclosed herein, certain embodiments of which are described in the following figures.

Turning to the embodiment of the method 301 for detecting synthetic identities as depicted in the flowchart of FIG. 3B, the processes of generating a layered graph network of linked users at 310, of deriving collective connectivity indicators from the layered graph network at 320, of reconstructing a user score progression in response to a user history of the given user at 330, and of deriving individual identity indicators from the reconstructed user score progression at 340 have been described above. The next step at 345 of applying rules to the collective connectivity indicators and the individual identity indicators will now be described below.

Once the system has derived signals or indicators having predictive value from the layered graph network and from user data at an individual level, rules are applied to ensure that the various indicators satisfy certain logical constraints that make sense in real world applications. In particular, the rules are a means of applying certain domain or industry-specific expertise and to make use of expert knowledge to inform more accurate predictions.

In the credit application example, certain constraints apply that are enforced through the application of a hard set of rules such that, if a rule is broken, the system determines that the user whose features violate the rule is in fact a synthetic identity. An example of an application of such a rule is that if the system determines that the social security number (SSN) issue date range of a user predates that user's date of birth, that user is a synthetic identity. As another example, if the system determines that two or more users are using the same SSN, but one of the users has three or more years of individual trade history (as evidenced by that user's credit report), all users sharing the same SSN and having less than three years of individual trade history are determined to be synthetic identities. In this case, the rule acknowledges the user having a sufficiently thick credit report (indicative of a longer credit history) as the legitimate user having the SSN, while all others having thin credit reports are deemed synthetic identities.

Conversely, a rule can be applied that determines a user to be an authentic or real identity and not a synthetic identity. For example, if the system determines that a user has an individual EDU or mortgage trade older than three years, that user is determined to be a real identity and not a synthetic identity. Similarly, if the system determines that a user has individual trades older than seven years, that user is determined to be a real identity and not a synthetic identity.

Note that these rules provide a few examples and that various rules or constraints are contemplated without limiting the scope of the system and method disclosed herein.

Returning back to FIG. 3B, the final step at 355 of determining a synthetic identity score for the given user in response to the collective connectivity indicators, the individual identity indicators, and the applied rules is described below.

After the system has derived signals or indicators having predictive value from the layered graph network and from user data at an individual level and has applied rules to enforce certain constraints as informed by expert knowledge in a particular domain, the resulting signals, indicators, and output of the applied rules are used as inputs to a machine learning model in order to generate a synthetic identity score for the given user. Various classification methods and machine learning techniques can be employed by the machine learning model (e.g., Synthetic Identity Score Generator 180 of FIG. 1). For instance, a gradient boosting machine (GBM) for regression and classification problems can be used to determine a synthetic identity score for a given user by producing a prediction model in the form of an ensemble of weak prediction models such as decision trees. Training instances can be provided to train the model, wherein the training instances are obtained from user data associated with known synthetic identities. Other classification methods such as artificial neural networks, random forests, Bayesian networks, decision tree algorithms, segmentation, clustering, linear classifiers, linear regression, logistic regression, etc. can also be employed including combinations of classification methods, other ensemble methods, and ensembles of classifiers that use multiple learning algorithms to obtain better predictive performance.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for detecting a synthetic identity, comprising:
a processor configured to:
generate a layered graph network of linked users configured to capture a group of similar applicants in response to user data associated with a given user, wherein the user data includes collected or monitored user activity and historical user data;
derive collective connectivity indicators from the layered graph network;
reconstruct a user score progression in response to a user history of the given user;
derive individual identity indicators from the reconstructed user score progression; and
determine a synthetic identity score for the given user in response to the collective connectivity indicators and the individual identity indicators, wherein the determined synthetic identity score indicates a likelihood that the given user is using a synthetic identity to conduct activities; and
a memory coupled to the processor and configured to provide the processor with instructions.

2. The system of claim 1, wherein the processor is further configured to:
generate the layered graph network of linked users including by applying a fuzzy clustering technique to soft-link users and a hard clustering technique to hard-link users; and
apply rules to the collective connectivity indicators and the individual identity indicators;
and determine the synthetic identity score for the given user in response to the applied rules.

3. The system of claim 1, wherein the processor is further configured to:
generate the layered graph network of linked users including by:
applying a fuzzy clustering technique to soft-link users and a hard clustering technique to hard-link users;
soft-linking users to the given user in response to a given soft user attribute to form a layer of associated soft-linked users; and
hard-linking users to each soft-linked user in the layer of associated soft-linked users to form a secondary layer of associated hard-linked users.

4. The system of claim 1, wherein the processor is further configured to:
generate the layered graph network of linked users including by:
applying a fuzzy clustering technique to soft-link users and a hard clustering technique to hard-link users;
soft-linking users to the given user in response to a given soft user attribute to form a layer of associated soft-linked users, wherein each soft-linked user in the layer of associated soft-linked users has one degree of separation from the given user;
hard-linking users to each soft-linked user in the layer of associated soft-linked users to form a secondary layer of associated hard-linked users, wherein each hard-linked user in the secondary layer of associated hard-linked users has two degrees of separation from the given user; and
linking users to the given user in response to a given user attribute to form a layer of associated linked users, wherein each linked user in the layer of associated linked users has one degree of separation from the given user.

5. The method of claim 1, wherein the processor is further configured to:
generate the layered graph network of linked users including by:
applying a fuzzy clustering technique to soft-link users and a hard clustering technique to hard-link users;
soft-linking users to the given user in response to a given soft user attribute to form a layer of associated soft-linked users, wherein each soft-linked user in the layer of associated soft-linked users has one degree of separation from the given user;
hard-linking users to each soft-linked user in the layer of associated soft-linked users to form a secondary layer of associated hard-linked users, wherein each hard-linked user in the secondary layer of associated hard-linked users has two degrees of separation from the given user;
hard-linking users to the given user in response to a given hard user attribute to form a layer of associated hard-linked users, wherein each hard-linked user in the layer of associated hard-linked users has one degree of separation from the given user; and
for each linked user in a given layer having two or more degrees of separation from the given user, linking additional users to each linked user in the given layer to form a subsequent layer of subsequently associated linked users to the linked users in the given layer.

6. The system of claim 5, wherein the layered graph network comprises a plurality of subsequent layers generated by recursively hard-linking additional users to linked users in the layered graph network in response to a set of shared hard attributes.

7. The system of claim 1, wherein the processor is further configured to:
generate the layered graph network of linked users including by:

applying a fuzzy clustering technique to soft-link users and a hard clustering technique to hard-link users;

soft-linking users to the given user in response to a given soft user attribute to form a layer of associated soft-linked users, wherein each soft-linked user in the layer of associated soft-linked users has one degree of separation from the given user;

generating a similarity score for a soft-linked user candidate as compared with the given user, wherein the layer of associated soft-linked users is formed by selecting soft-linked user candidates to be soft-linked users in response to similarity scores of the soft-linked user candidates;

hard-linking users to each soft-linked user in the layer of associated soft-linked users to form a secondary layer of associated hard-linked users, wherein each hard-linked user in the secondary layer of associated hard-linked users has two degrees of separation from the given user;

hard-linking users to the given user in response to a given hard user attribute to form a layer of associated hard-linked users, wherein each hard-linked user in the layer of associated hard-linked users has one degree of separation from the given user; and for each linked user in a given layer having two or more degrees of separation from the given user, hard-linking additional users to each linked user in the given layer to form a subsequent layer of subsequently associated hard-linked users to the linked users in the given layer, wherein the layered graph network comprises a plurality of subsequent layers generated by recursively hard-linking additional users to linked users in the layered graph network in response to a set of shared hard attributes.

8. The system of claim 7, wherein the processor is further configured to determine a set of soft-linked users to be soft-linked to the given user by setting a threshold score value and selecting soft-linked user candidates having a similarity score above the threshold score value to be soft-linked users.

9. The system of claim 7, wherein the processor is further configured to determine a set of soft-linked users to be soft-linked to the given user by selecting a specific number of soft-linked user candidates having a highest value of similarity scores to be soft-linked users.

10. The system of claim 1, wherein the processor is further configured to:

generate the layered graph network of linked users including by:

soft-linking users to the given user in response to a plurality of given soft user attributes to form a layer of associated soft-linked users, wherein each soft-linked user in the layer of associated soft-linked users has one degree of separation from the given user;

generating a similarity score for a soft-linked user candidate as compared with the given user in response to each of the plurality of given soft user attributes, wherein the layer of associated soft-linked users is formed by selecting soft-linked user candidates to be soft-linked users in response to similarity scores of the soft-linked user candidates including by selecting a specific number of soft-linked user candidates having a highest value of similarity scores to be soft-linked users;

hard-linking users to each soft-linked user in the layer of associated soft-linked users to form a secondary layer of associated hard-linked users, wherein each hard-linked user in the secondary layer of associated hard-linked users has two degrees of separation from the given user;

hard-linking users to the given user in response to a given hard user attribute to form a layer of associated hard-linked users, wherein each hard-linked user in the layer of associated hard-linked users has one degree of separation from the given user; and for each linked user in a given layer having two or more degrees of separation from the given user, hard-linking additional users to each linked user in the given layer to form a subsequent layer of subsequently associated hard-linked users to the linked users in the given layer, wherein the layered graph network comprises a plurality of subsequent layers generated by recursively hard-linking additional users to linked users in the layered graph network in response to a set of shared hard attributes; and wherein the processor is further configured to:

combine the similarity scores of each of the plurality of given soft user attributes for the soft-linked user candidate into a single soft-linked similarity score for the soft-linked user candidate and derive collective connectivity indicators in response to the combined single soft-linked similarity score for the soft-linked user candidate selected to be a soft-linked user;

apply rules to the collective connectivity indicators and the individual identity indicators; and determine the synthetic identity score for the given user in response to the applied rules.

11. The system of claim 10, wherein the plurality of given soft user attributes comprises an address and a sequence of historical user events and wherein the processor is configured to generate a similarity score in response to each of the plurality of given soft user attributes including by:

generating an address similarity score in response to querying a geospatial database to determine a distance between an address associated with the given user and an address associated with a given soft-linked user candidate; and generating an event sequence similarity score indicative of a similarity between a sequence of given user historical consumer events associated with the given user and a sequence of user candidate historical consumer events associated with the given soft-linked user candidate.

12. The system of claim 11, wherein the processor is further configured to generate the address similarity score in response to:

the determined distance between the address associated with the given user and the address associated with the given soft-linked user candidate; and a difference in an age of the address associated with the given user and an age of the address associated with the given soft-linked user candidate.

13. The system of claim 11, wherein the processor is further configured to:

generate the sequence of given user historical consumer events by transforming raw consumer event data associated with the given user into sequences of given user categorical variables at different granularities; and generate the sequence of user candidate historical consumer events by transforming raw consumer event data associated with the soft-linked user candidate into sequences of user candidate categorical variables at different granularities.

14. The system of claim 11 wherein the processor is further configured to generate the event sequence similarity score in response to a similarity metric using a sequence alignment algorithm.

15. The system of claim 14, wherein the similarity metric is a Hamming distance.

16. A method of detecting a synthetic identity, comprising:
generating a layered graph network of linked users configured to capture a group of similar applicants in response to user data associated with a given user, wherein the user data includes collected or monitored user activity and historical user data;
deriving collective connectivity indicators from the layered graph network;
reconstructing a user score progression in response to a user history of the given user;
deriving individual identity indicators from the reconstructed user score progression;
applying rules to the collective connectivity indicators and the individual identity indicators; and
applying machine learning techniques to determine a synthetic identity score for the given user in response to the collective connectivity indicators, the individual identity indicators, and the applied rules, wherein the determined synthetic identity score indicates a likelihood that the given user is using a synthetic identity to conduct activities.

17. The method of claim 16, comprising:
generating the layered graph network of linked users by applying a fuzzy clustering technique to soft-link users and a hard clustering technique to hard-link users;
soft-linking users to the given user in response to a given soft user attribute to form a layer of associated soft-linked users, wherein each soft-linked user in the layer of associated soft-linked users has one degree of separation from the given user;
hard-linking users to each soft-linked user in the layer of associated soft-linked users to form a secondary layer of associated hard-linked users, wherein each hard-linked user in the secondary layer of associated hard-linked users has two degrees of separation from the given user;
for each linked user in a given layer having two or more degrees of separation from the given user, hard-linking additional users to each linked user in the given layer to form a subsequent layer of subsequently associated hard-linked users to the linked users in the given layer; and
wherein the layered network comprises a plurality of subsequent layers generated by recursively hard-linking additional users to linked users in the layered graph network in response to a set of shared hard attributes and wherein soft-linking in response to the given soft user attribute comprises generating a similarity score for a soft-linked user candidate as compared with the given user and selecting the soft-linked user candidate to be a soft-linked user in response to the similarity score of the soft-linked user candidate.

18. The method of claim 16, comprising:
generating the layered graph network of linked users by applying a fuzzy clustering technique to soft-link users and a hard clustering technique to hard-link users;
soft-linking users to the given user in response to a plurality of given soft user attributes to form a layer of associated soft-linked users, wherein each soft-linked user in the layer of associated soft-linked users has one degree of separation from the given user;
generating a similarity score for a soft-linked user candidate as compared with the given user in response to each of the plurality of given soft user attributes, wherein the layer of associated soft-linked users is formed by selecting soft-linked user candidates to be soft-linked users in response to similarity scores of the soft-linked user candidates;
hard-linking users to each soft-linked user in the layer of associated soft-linked users to form a secondary layer of associated hard-linked users, wherein each hard-linked user in the secondary layer of associated hard-linked users has two degrees of separation from the given user;
for each linked user in a given layer having two or more degrees of separation from the given user, hard-linking additional users to each linked user in the given layer to form a subsequent layer of subsequently associated hard-linked users to the linked users in the given layer, wherein the layered graph network comprises a plurality of subsequent layers generated by recursively hard-linking additional users to linked users in the layered graph network in response to a set of shared hard attributes;
combining the similarity scores of each of the plurality of given soft user attributes for the soft-linked user candidate into a single soft-linked similarity score for the soft-linked user candidate; and
deriving collective connectivity indicators from the layered graph network in response to the combined single soft-linked similarity score for the soft-linked user candidate selected to be a soft-linked user.

19. The method of claim 18, wherein the plurality of given soft user attributes comprises an address and a sequence of historical consumer events, the method further comprising:
generating an address similarity score in response to querying a geospatial database to determine a distance between an address associated with the given user and an address associated with a soft-linked user candidate; and
generating an event sequence similarity score indicative of a similarity between a sequence of given user historical consumer events associated with the given user and a sequence of user candidate historical consumer events associated with the soft-linked user candidate.

20. The method of claim 19, comprising:
generating the address similarity score in response to the determined distance between the address associated with the given user and the address associated with the soft-linked user candidate and a difference in an age of the address associated with the given user and an age of the address associated with the given soft-linked user candidate;
generating the sequence of given user historical consumer events by transforming raw consumer event data associated with the given user into sequences of given user categorical variables at different granularities; and
generating the sequence of user candidate historical consumer events by transforming raw consumer event data associated with the soft-linked user candidate into sequences of user candidate categorical variables at different granularities.

* * * * *